(12) United States Patent
Trump et al.

(10) Patent No.: US 9,721,230 B2
(45) Date of Patent: Aug. 1, 2017

(54) DEVELOPER MODE FOR WORKFLOW SYSTEMS STEERING PATCH DEPLOYMENT

(71) Applicant: SAP SE, Walldorf (DE)

(72) Inventors: Ronald Trump, Wiesloch (DE); Harald Schubert, Mannheim (DE); Tobias Breyer, Heidelberg (DE); Peter Gernold, Schriesheim (DE); Stefan Henke, Plankstadt (DE); Krassimir Kondarev, Walldorf (DE); Torsten Wecke, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/817,790

(22) Filed: Aug. 4, 2015

(65) Prior Publication Data

US 2017/0039520 A1 Feb. 9, 2017

(51) Int. Cl.
*G06F 9/44* (2006.01)
*G06Q 10/10* (2012.01)

(52) U.S. Cl.
CPC .................... *G06Q 10/103* (2013.01)

(58) Field of Classification Search
CPC ...... G06Q 10/06; G06Q 10/0633; G06F 8/71; G06F 9/5038
See application file for complete search history.

(56) References Cited

U.S. PATENT DOCUMENTS

| | | | |
|---|---|---|---|
| 7,027,997 B1* | 4/2006 | Robinson | G06Q 10/06311 705/7.13 |
| 7,966,260 B2 | 6/2011 | Gernold | |
| 8,010,484 B2 | 8/2011 | Gernold | |
| 8,060,866 B2* | 11/2011 | Weatherbee | G06F 11/362 717/127 |
| 8,091,043 B2 | 1/2012 | Schubert et al. | |
| 8,316,380 B2 | 11/2012 | Keil et al. | |
| 8,745,635 B2 | 6/2014 | Balko et al. | |
| 8,904,343 B2 | 12/2014 | Balko et al. | |
| 8,972,868 B2 | 3/2015 | Schubert | |
| 9,430,745 B2* | 8/2016 | Leymann | G06Q 10/06 |
| 2007/0276715 A1* | 11/2007 | Beringer | G06Q 10/0633 705/7.27 |

(Continued)

*Primary Examiner* — Duy Khuong Nguyen
(74) *Attorney, Agent, or Firm* — Fish & Richardson P.C.

(57) ABSTRACT

In a first method, a developer mode is determined when a workflow template patch is received, and execution of new workflow instances is either blocked or permitted, or continued execution of workflow instances is forbidden. In a second method, parallelization of workflow execution is provided in an in-memory database management system. In a third method, after received user privilege information, database records associated with a workflow are determined and stored for use at workflow instance runtime. In a fourth method, artifacts used by a workflow are identified using a workflow template. When a command to execute a workflow instance is received, information is stored for generating instances of artifacts for use during execution of the workflow instance. In a fifth method, for a workflow template to be inactivated, the associated workflow template is suspended after currently executing workflow instances have completed and job executors have acknowledged a suspending state.

18 Claims, 16 Drawing Sheets

(56) References Cited

U.S. PATENT DOCUMENTS

| | | | |
|---|---|---|---|
| 2008/0115195 A1* | 5/2008 | Malek | G06Q 10/10 726/4 |
| 2009/0064130 A1* | 3/2009 | Davis | G06F 8/10 717/173 |
| 2014/0013315 A1* | 1/2014 | Genevski | G06F 8/60 717/170 |
| 2014/0207927 A1* | 7/2014 | Fichtenholtz | H04L 67/16 709/223 |

* cited by examiner

DEVELOPER MODE FOR WORKFLOW SYSTEMS STEERING PATCH DEPLOYMENT

BACKGROUND

The present disclosure relates to the management and execution of workflows.

A workflow can be used as a tool to automate complex business processes, such as when more than one user is involved in completing a process. For example, a workflow is a process tool that is designed to facilitate and automate business processes involving task sequences performed by the users (e.g., people in the workplace). Workflows can ensure that work is assigned in a proper sequence to the right people at the right time. Using a workflow, for example, each step of a business transaction can be easily monitored throughout the initiation and completion of a business process. The workflow can enable process owners to track deadlines, determine workloads, and provide statistics on the length of time to complete work processes. Example components of workflows include workflow definitions, work items, event triggers, and an organizational structure (e.g., in the workplace). Workflows can be an integrated part of an application server.

SUMMARY

The disclosure generally describes computer-implemented methods, software, and systems for a workflow management system. In a first method, a developer mode is determined when a workflow template patch is received, and execution of new workflow instances is either blocked or permitted, or continued execution of workflow instances is forbidden. In a second method, parallelization of workflow execution is provided in an in-memory database management system. In a third method, after received user privilege information, database records associated with a workflow are determined and stored for use at workflow instance runtime. In a fourth method, artifacts used by a workflow are identified using a workflow template. When a command to execute a workflow instance is received, information is stored for generating instances of artifacts for use during execution of the workflow instance. In a fifth method, for a workflow template to be inactivated, the associated workflow template is suspended after currently executing workflow instances have completed and job executors have acknowledged a suspending state.

Using a "Developer Mode" in Workflow Systems

The present disclosure relates to computer-implemented methods, software, and systems for using workflows. In some implementations, e.g., of methods, a patch to a workflow template associated with a workflow is received from a client associated with a user. A mode associated with the system is determined, the mode being a developer-ON mode or a developer-OFF mode. The workflow template is updated using the patch, including using mode-dependent actions based on the determined mode. The updating includes blocking execution of new workflow instances of the workflow, allowing for the deployment of the updated workflow template, allowing starting of new workflow instances during the deployment. When the determined mode is the developer-ON mode, execution of new workflow instances of the workflow is blocked using database-level locks, the execution of new workflow instances is unblocked, and the execution of existing workflow instances is continued with the newest workflow template patch version no matter on which patch version the workflow instances originally have been started. When the determined mode is a developer-OFF mode, execution of new workflow instances of the workflow is blocked using double handshake method, the continued execution of existing workflow instances associated with the latest patch version of that workflow template is permitted, and the continued execution of existing workflow instances associated with an older patch version of the workflow template is forbidden.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further comprises, when the determined mode is the developer-OFF mode, receiving an input to suspend workflows prior to updating and deploying the workflow template.

In a second aspect, combinable with any of the previous aspects, the method further comprises resuming execution of suspended workflows upon completion of updating and deploying the workflow template.

In a third aspect, combinable with any of the previous aspects, suspending workflow instances and resuming execution of suspended workflow instances includes using flags associated with the workflow template, the resuming including periodically checking the flags by a workflow manager.

In a fourth aspect, combinable with any of the previous aspects, the method further comprises receiving temporal information identifying a time at which the workflow template is to be updated and deployed; and delaying the updating and deploying of the workflow template until the identified time.

In a fifth aspect, combinable with any of the previous aspects, the patch includes one or more of a change in steps of the workflow, data used or created by the workflow instance, and user interaction associated with the workflow.

Lock-Free Execution of Workflow Instances

In some implementations, e.g., of methods, a workflow instance is received from a synchronous application for execution, the workflow instance representing an executable instance of a workflow defined by an associated workflow template. Using the workflow template, steps in the received workflow instance are identified. For each step in the workflow instance, a token is created for execution of the step in a lock-free asynchronous queue. The created tokens are stored in a database for subsequent execution.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further comprises executing the workflow instance, including accessing the stored tokens from the database.

In a second aspect, combinable with any of the previous aspects, executing the workflow instance includes periodically identifying a set of active tokens and executing the tokens from the set of active tokens in a loop, including for each token: executing a particular token; marking the token as being executed; and identifying subsequent tokens to be executed.

In a third aspect, combinable with any of the previous aspects, each workflow is assigned a unique workflow identifier, and executing each workflow instance includes determining, using the unique workflow identifier assigned to a particular workflow, a particular executor from N plural executors and executing tokens associated with the workflow instance using the determined particular executor the workflow instance.

In a fourth aspect, combinable with any of the previous aspects, the unique workflow identifier is a positive integer, determining the particular executor includes using a function to determine an executor number, and determining the particular executor includes selecting the particular executor using the determined executor number.

In a fifth aspect, combinable with any of the previous aspects, the function is a modulo function using the unique workflow identifier modulo N.

Record-Level Security Access in In-Memory Database

In some implementations, e.g., of methods, user privilege information associated with a user is received for data used in a workflow by the user. Database records associated with the workflow to be stored at a database level are determined using the received user privilege information, the database records accessible at runtime when the user executes a workflow instance associated with the workflow. The database records are stored for subsequent use.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further comprises: receiving, during execution of the workflow instance, a request for access to data in the workflow instance; accessing the stored user privileges at the database level; determining that the database records indicate user privileges associated with the data; and providing access, by the user, to the data associated with the request if user has access.

In a second aspect, combinable with any of the previous aspects, the database records identify user privileges at a user role level, and determining that the database records indicate user privileges associated with the data includes determining that the user has a particular user role consistent with user privileges stored for a particular user role.

In a third aspect, combinable with any of the previous aspects, user privileges are granted at a row level.

In a fourth aspect, combinable with any of the previous aspects, user privileges are granted, at least in part, based on an application with which the user is interfacing.

Leveraging In-Memory Platform Artifacts

In some implementations, e.g., of methods, one or more artifacts used by a workflow are identified, the one or more artifacts depending on a workflow template that defines the workflow. A command is received to create and execute a workflow instance associated with the workflow. Information for the one or more artifacts is storied for the workflow instance and in a workflow data model according to the workflow template, the workflow data model including components for generating an instance of each of the one or more artifacts in advance of and for the purpose of execution of the workflow instance.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further comprises determining a platform on which the workflow instance is executing and using the identified platform when generating the instances of the one or more artifacts, including generating the artifacts in a format compatible with the platform.

In a second aspect, combinable with any of the previous aspects, each artifact of the one or more artifacts is of an artifact type selected from the group comprising SQL DDL statements, database tables, and views.

In a third aspect, combinable with any of the previous aspects, each artifact of the one or more artifacts includes imperative SQL artifacts including stored procedures reading from or modifying contents of a respective artifact.

In a fourth aspect, combinable with any of the previous aspects, the workflow template provides sufficient semantic information to enable non-trivial optimization strategies.

In a fifth aspect, combinable with any of the previous aspects, the workflow template includes one or more of data model references, data model descriptions, control flow descriptions, data flow and transformation descriptions, information about background services to be called, and information about tasks for human users respectively about integrating user task management systems.

In a sixth aspect, combinable with any of the previous aspects, the components include a template component, a workflow component, and a workflow controller.

In a seventh aspect, combinable with any of the previous aspects, the one or more artifacts used by the workflow are used in an in-memory database platform, and wherein the instance is an in-memory instance.

In an eighth aspect, combinable with any of the previous aspects, each artifact of the one or more artifacts is an imperative artifact executable on application systems.

Protection of Running Workflows Against Deployment of Workflow Model Patches

In some implementations, e.g., of methods, a command is received to inactivate a workflow template. An indication is made to plural job executors that the workflow template is in a suspending state. Waiting occurs for each of the plural job executors to acknowledge the suspending state. The workflow template is suspended, including putting the workflow template in a suspended state, when currently executing workflow instances associated with the workflow template have completed and all of the plural job executors have acknowledged the suspending state.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, suspending and suspended states are indicated by entries in a table associated with the workflow template.

In a second aspect, combinable with any of the previous aspects, the method further comprises allowing additional workflow instances to be started during the suspending state.

In a third aspect, combinable with any of the previous aspects, the method further comprises indicating, to the plural job executors, that the workflow template is in a resuming state, and when all of the plural job executors have acknowledged the resuming state, indicating that the workflow template is in a running state.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements, according to an implementation.

DETAILED DESCRIPTION

This disclosure generally describes computer-implemented methods, software, and systems for workflow management systems.

A workflow can define a sequence of steps to be performed by one or more users to complete a business process. The actual steps of a workflow can be defined in a workflow template, which is a blueprint of sorts for creating workflow instances. When a workflow is executed, it is actually the workflow instance that is executed, using information from the workflow template. There can be several workflow instances from the same workflow instance executing at one time.

Workflows can change, e.g., for reasons associated with business processes. The change to a workflow can be captured in corresponding changes in the associated workflow template. At the time of a change to a workflow template, there may be associated workflow instances in execution.

This disclosure describes five different subjects related to workflow management. The subject of a developer mode in workflow systems is discussed with reference to FIGS. 2A-2C and 3. The subject of lock-free execution of workflow instances is discussed with reference to FIGS. 4-6. The subject of record-level security access in in-memory databases is discussed with reference to FIGS. 7-9. The subject of leveraging in-memory platform artifacts is discussed with reference to FIGS. 10-13. The subject of protecting running workflows against deployment of workflow model patches is discussed with reference to FIGS. 14-16.

Figure 1:
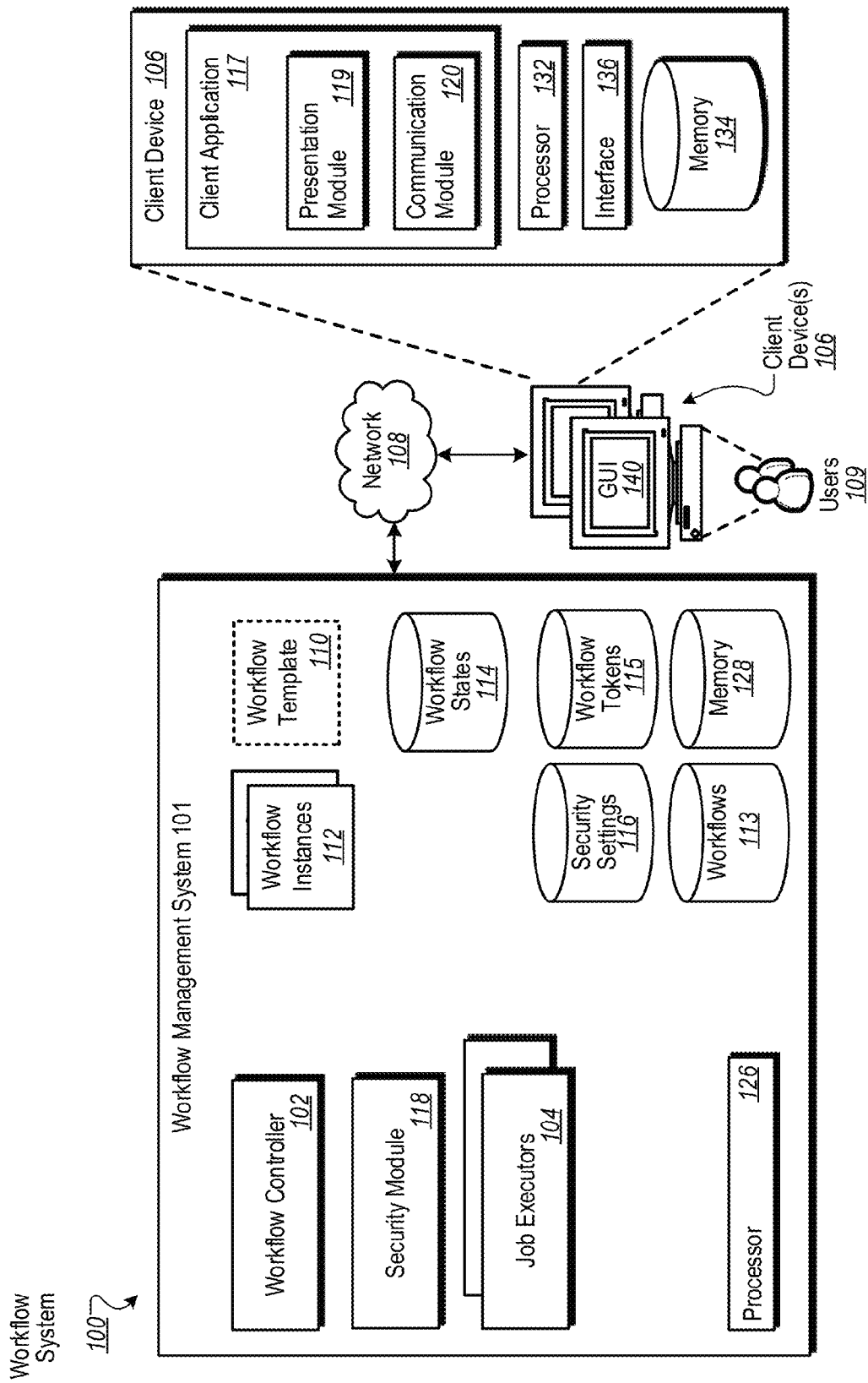
FIG. 1 is a block diagram of an example workflow system for managing and executing workflows, according to an implementation.

FIG. 1 is a block diagram of an example workflow system 100 for managing and executing workflows, according to an implementation. The illustrated workflow system 100 includes, or is communicably coupled with, plural client devices 106, and a workflow management system 101, all connected using a network 108. For example, the workflow system 100 can be used to provide access, for users 109 of the plural client devices 106, to applications provided by the workflow management system 101.

At a high level, the workflow management system 101 comprises an electronic computing device operable to manage and execute workflows for use by the client device 106. For example, the workflow management system 101 can deploy an updated version of a workflow template 110 when one is provided by a user 109 using a client device 106. The databases 113-116 can include databases that are stored or distributed in plural locations, e.g., at the client device 106, at the workflow management system 101, and/or other locations.

The workflow management system 101 can receive, from the client device 106, information associated with user access to certain data, e.g., including business objects and particular rows and/or columns associated with the business objects. The workflow management system 101 can also grant user privileges on a row (e.g., record) level and/or on a column level, e.g., for certain fields in records. The workflow controller 102 can receive a workflow instance 112 (e.g., an instance of the workflow template 110) for a workflow to be executed by job executors 104. The workflow template 110 can include information, for example, identifying specific steps in the workflow, data used in the workflow, and specific user interactions associated with the workflow.

The workflow instance 112 can be provided (or identified for execution) by a user at the client device 106. For example, the identified workflow may be one of plural workflows stored in the database of workflows 113. When a workflow instance 112 is to be executed, for example, a workflow controller 102 in the workflow management system 101 can retrieve information about the workflow from the workflow template 110, which may be stored in one or more tables in a relational database. The workflow controller 102, for example, can create a token for each of the steps in the workflow. The workflow controller 102 can store the created tokens for the workflow instance 112 in a database of workflow tokens 115 (e.g., in table entries). When a workflow instance 112 is to be executed, the workflow controller 102 can read and execute tokens from the database of workflow tokens 115. A database of workflow states 114 can identify current states of workflow instances 112 that are in execution.

A security module 118, for example, can process the received user privilege information in order to generate table entries for use at runtime. For example, the security module 118 can store the database records in a database of security settings 116. The security module 118 can also support operations for using the stored user privilege information. For example, during execution of the workflow instance, a request for access to data in the workflow instance can be received. The stored user privileges are accessed at the database level. A determination can be made (e.g., by the security module 118) that the database records indicate user privileges associated with the data. If the determination indicates that the user has access, then user access to the data associated with the request can be provided.

As used in the present disclosure, the term "computer" is intended to encompass any suitable processing device. For example, although FIG. 1 illustrates a single workflow management system 101, workflow system 100 can be implemented using two or more workflow management systems 101, as well as computers other than servers, including a server pool. In some implementations, components of the workflow management system 101 may be distributed in different locations and coupled using the network 108.

The workflow management system 101 further includes a processor 126 and memory 128. Although illustrated as the single processor 126 in FIG. 1, two or more processors 126 may be used according to particular needs, desires, or particular implementations of the workflow system 100. Each processor 126 may be a central processing unit (CPU), an application specific integrated circuit (ASIC), a field-programmable gate array (FPGA), or another suitable component. Generally, the processor 126 executes instructions and manipulates data to perform the operations of the client device 106. Specifically, the processor 126 executes the functionality required to receive and process requests from the client device 106.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the workflow management system 101. In some implementations, memory 128 includes one or more of the data elements 113-116 (described above). Other components within the memory 128 are possible.

Each client device 106 of the workflow system 100 may be any computing device operable to connect to, or communicate with, at least the workflow management system 101 via the network 108 using a wire-line or wireless connection. In general, the client device 106 comprises an electronic computer device operable to receive, transmit, process, and store any appropriate data associated with the workflow system 100 of FIG. 1.

The workflow controller 102 can handle inputs received from the client device 106. Specifically, the workflow controller 102 can process requests (e.g., requests to deploy workflow patches) received from the client application 117 (or its components 119-120). For example, a presentation module 119 can handle user interface aspects of applications that are accessed through the workflow management system 101. A communication module 120 can handle communication between the client application 117 and the workflow management system 101, for example.

The illustrated client device 106 further includes a processor 132, a memory 134, and an interface 136. The interface 136 is used by the client device 106 for communicating with other systems in a distributed environment— including within the workflow system 100—connected to the network 108, e.g., the workflow management system 101, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated workflow system 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, JAVA, Visual Basic, Assembler, PERL, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 106 includes the processor 132. Although illustrated as the single processor 132 in FIG. 1, two or more processors 132 may be used according to particular needs, desires, or particular implementations of the workflow system 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 106. Specifically, the processor 132 executes the functionality required to send requests to the workflow management system 101 and to receive and process responses from the workflow management system 101.

The illustrated client device 106 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 106.

The illustrated client device 106 is intended to encompass any computing device such as a smart phone, tablet computing device, PDA, desktop computer, laptop/notebook computer, wireless data port, one or more processors within these devices, or any other suitable processing device. For example, the client device 106 may comprise a computer that includes an input device, such as a keypad, touch screen, or other device that can accept user information, and an output device that conveys information associated with the operation of the workflow management system 101 or the client device 106 itself, including digital data, visual information, or a graphical user interface (GUI) 140, as shown with respect to and included by the client device 106. The GUI 140 interfaces with at least a portion of the workflow system 100 for any suitable purpose, including generating user interface screens for generating search queries and viewing the results. Further, the GUI 140 may be used to view and navigate various web pages located both internally and externally to the workflow management system 101.

Using a "Developer Mode" in Workflow Systems

This section addresses the use of a Developer Mode when using workflow systems. Specifically, the mode can be set to Developer Mode=ON when a developer is developing a workflow, such as making frequent changes and trying them out. These types of software development activities can include the productive development of workflow-based applications among a continuum of different activities, e.g., categorized into phases such as design, development, testing, and finally operation of the software.

During all these phases, different qualities are expected from a workflow system. A workflow system, for the purpose of this invention, represents a class of software systems specifically built for the purpose of automating a business process. Differences among the phases can be most apparent, for example, when looking at development and production systems.

On a development system, developer productivity, e.g., including the speed and comfort at which a developer can interact and work with the system, can generally be considered more important than overall system performance and data consistency. A production system, on the other hand, can seek to prioritize optimal performance (e.g., high throughput, low latency, etc.) and data consistency (e.g., no corrupt workflow instances).

Typical common workflow systems may not consider the system's use: e.g., development versus production. That is, common workflow systems may generally behave in exactly the same way, regardless of use (e.g., development versus production). As a result, as consistency and performance generally weigh stronger than developer productivity, developer experience may often be impacted in a negative way.

Issues associated with development versus production use may be particularly prevalent when looking, for example, at the deployment of workflow model patches to a workflow system. In the context of this document, a workflow model represents the description of a business process in a graphical or textual form. Based on a workflow model, workflow instances can be created which represent concrete examples of the workflow model in question. One example of a workflow model can be the description of the procedure to be followed for ordering goods in a company. A workflow instance (e.g., based on the model) would then be a concrete order of an employee buying a certain book. Because processes in a company change over time, workflow models may need to be changed accordingly to reflect new requirements. As such, a workflow model patch can represent a change to a workflow model that typically becomes relevant only for new workflow instances created after the patch is deployed.

On a production system, for example, the patch typically does not affect currently executing workflow instances (e.g., which may be long-running workflows, such as a process of ordering a company car). As such, the patch may only be considered when creating new workflow instances. Otherwise, data inconsistencies can easily arise. On a developer system, however, where the developer needs to be able to quickly and iteratively change a workflow model, having to create new instances with every patch may be counterproductive. The developer can take possible inconsistencies for granted as long as the development roundtrip is fast. When in doubt, for example, the developer can simply cancel (e.g., manually) the inconsistent workflow instance.

To solve this problem, this document introduces a developer mode for workflow systems. The developer mode can be used, for example, to steer the behavior of the workflow system. Depending on whether the developer mode is turned on or off for a given workflow system, for example, the system can behave in one or the other way. More specifically, the developer mode can steer the behavior of workflow systems during (or associated with) the deployment of workflow model patches.

In order to better understand the motivation behind a developer mode affecting patch deployment, it is useful to understand how workflow systems operate and how they execute workflow instances. At its core, a workflow system is typically based around a job infrastructure that executes workflow instances asynchronously. Any number of jobs can be configured to run a number workflow instances.

Figure 2A:
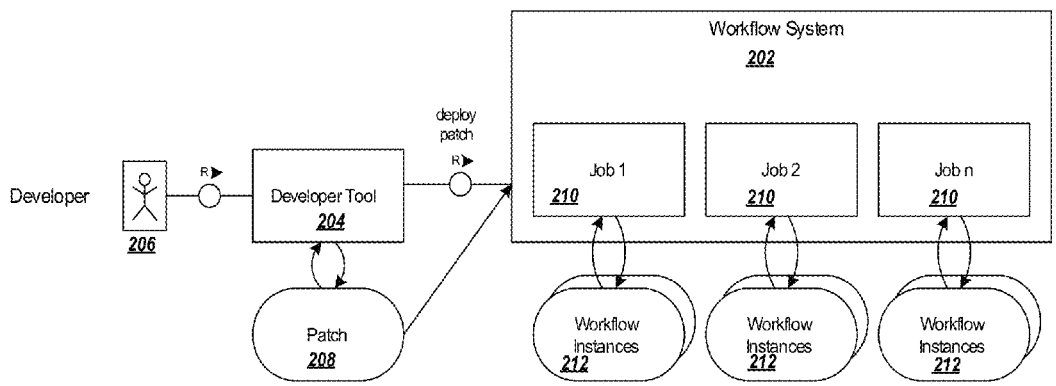
FIG. 2A is a block diagram of example interaction with a workflow system, according to an implementation.

FIG. 2A is a block diagram of example interaction with a workflow system 202, according to an implementation. For example, the workflow system 202 may be accessed by a developer tool 204 that is in use by a developer 206. As part of a process for developing workflows, the developer 206 may provide, through the developer tool 204, a patch 208 that is to be applied to a specific workflow template (e.g., represented by jobs 210). Each of the workflow templates may have any number of associated workflow instances running a time, such as when the patch 208 is created and available for deployment. In this example, patches 208 can be introduced anytime, e.g., independent of a particular mode indicated by the developer tool 204 and without automatic coordination with currently executing workflow instances. In some implementations, the workflow system 202 can be part of and/or implemented by the workflow management system 101.

As such, while the interaction shown in FIG. 2A may provide an acceptable solution performance-wise, the interaction can lead to the challenge of having to coordinate the deployment of a patch with all the jobs involved. For example, jobs may need to be signaled that the jobs should stop execution of instances for the affected workflow model before patch deployment can take place. Depending on how coordination is done, for example, either the overall system performance or developer productivity may be impacted.

Figure 2B:
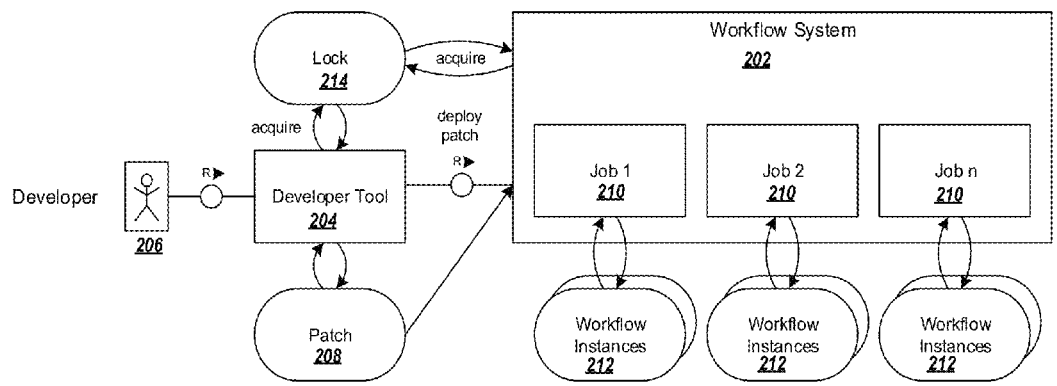
FIG. 2B is a block diagram of example interaction with the workflow system with the developer mode ON, according to an implementation.

FIG. 2B is a block diagram of example interaction with the workflow system 202 with the developer mode ON, according to an implementation. For example, if the developer mode is turned ON, the following behavior can be followed. Jobs and patch deployment can both use database-level locks 214, for example, to block the execution of workflow instances for the time of patch deployment. This stop-the-world mode, for example, can make it particularly easy for the developer 206 to try out a change to a workflow model without considering any additional precautions. Because jobs may also acquire the very same locks, workflow execution can be considerably slower than if no locks are used. However, this is an acceptable result, because on a development system, performance is secondary. When developer mode is ON, the developer 206 can deploy patches repeatedly and at any time. Workflow instances can execute based on the latest patch for the corresponding workflow model, irrespective of the patch under which the workflow instance was started. In this example, inconsistencies may occur, but the inconsistencies are acceptable from a developer perspective as inconsistent instances can be manually cancelled if needed. Other and/or different specific actions are possible when the developer mode is ON.

FIG. 2B is a block diagram of example interaction with the workflow system 202 with the developer mode OFF, according to an implementation. For example, if the developer mode is turned OFF (e.g., when the system is used productively), then the system can behave as follows. Additional administrative actions can be taken, and consistency measures can be enforced to guarantee a proper deployment of patches without causing inconsistencies, while at the same time ensuring the best performance possible. An administrator can specify jobs for which execution of workflow instances for the target workflow model can be suspended, e.g., before the deployment of the patch is performed. Although no locks are acquired on either side, flags 216 and 218 can be used to notify the jobs to suspend or resume execution, respectively. Jobs can periodically check the flags, for example, and react accordingly. Depending on the frequency at which jobs are scheduled, this response may not be immediate (e.g., may take up to a few minutes). For a developer, this type of behavior would be unacceptable system behavior. However, for an administrator managing a production system, this is a compromise that can easily be accepted if performance is boosted in return. Further contributing to acceptance is that patches are typically deployed only seldom and short develop-test cycles are not performed.

After the deployment of a new patch is done, jobs need to resume execution. Analogously, a flag can be used, for example, to signal a resume command to the jobs. Workflow instances are only executed if the patch they were started with matches the currently deployed patch for the corresponding workflow model. Patch deployment can be done at a scheduled time, e.g., outside of business hours, or at a time configured by the system administrator. Other and/or different specific actions are possible when the developer mode is OFF.

The use of developer modes (e.g., ON versus OFF) can provide several advantages over common workflow systems. For example, typical workflow systems may not exhibit different behavior depending on the system's purpose (e.g., development, testing, or productive use). Although workflow systems may be configured based on system size, such size configuration may allow adaption by the workflow system to the available hardware and expected load. The configuration may also enable tracing of additional information useful for a developer, with the workflow systems needing to change their behavior.

Figure 2C:
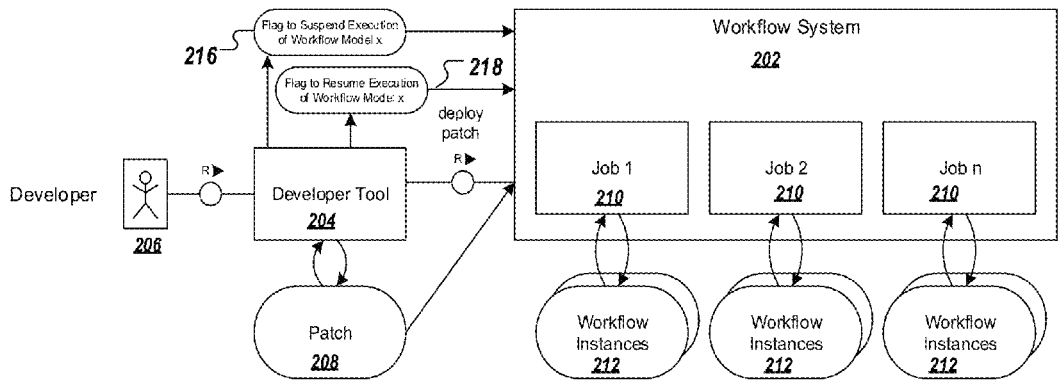
FIG. 2C is a block diagram of example interaction with the workflow system with the developer mode OFF, according to an implementation.
Figure 3:
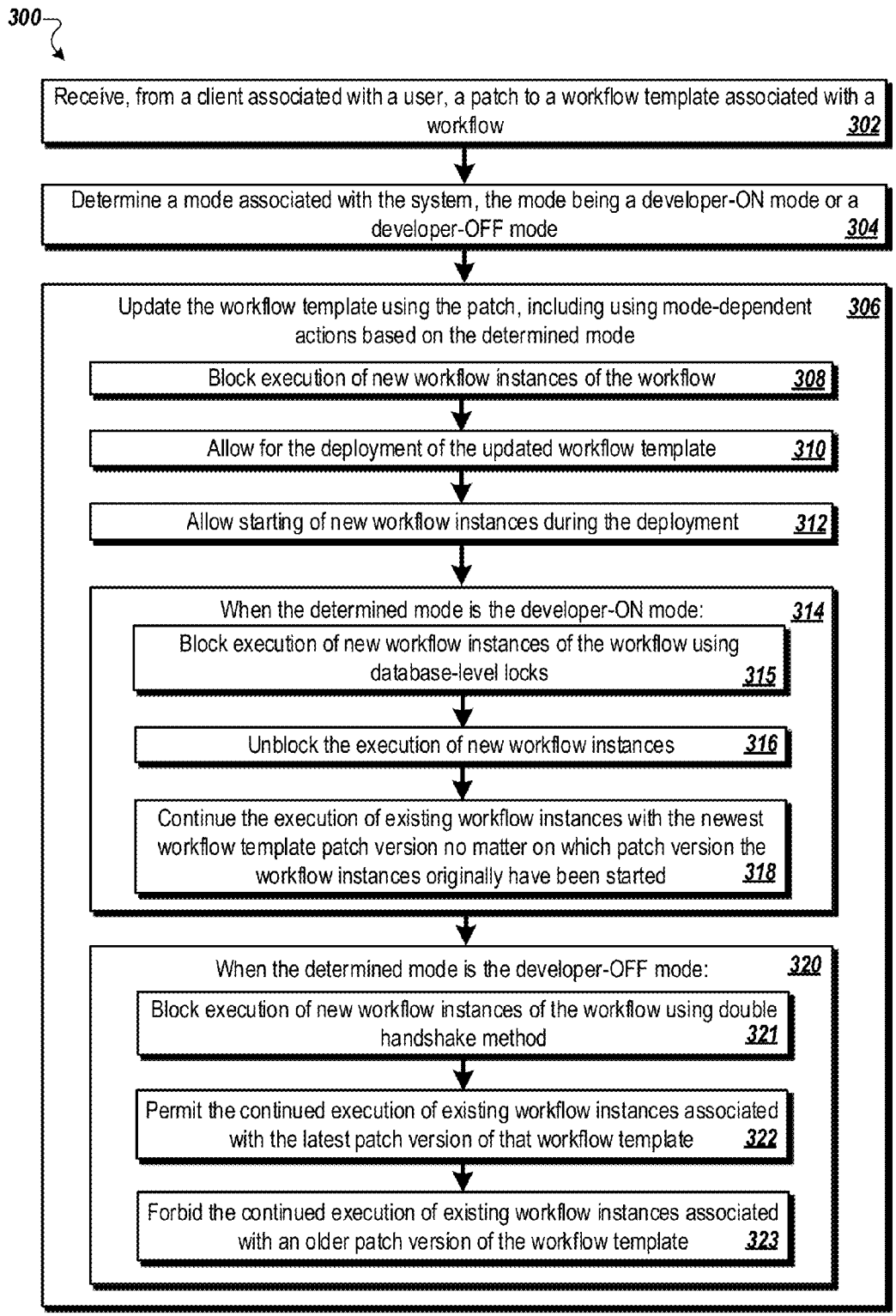
FIG. 3 is a flowchart of an example method for deploying a patch to a workflow, according to an implementation.

FIG. 3 is a flowchart of an example method 300 for deploying a patch to a workflow, according to an implementation. For clarity of presentation, the description that follows generally describes method 300 in the context of FIGS. 1 and 2A-2C. However, it will be understood that the method 300 may be performed, for example, by any other suitable system, environment, software, and hardware, or a combination of systems, environments, software, and hardware as appropriate. For example, the workflow system 100 and/or its components can be used to execute the method 300.

At 302, a patch to a workflow template associated with a workflow is received from a client associated with a user. For example, referring to FIG. 2A, the workflow system 202 can receive the patch 208 from a developer 206, e.g., through the developer tool 204.

In some implementations, the patch includes one or more of a change in steps of the workflow, data used or created by the workflow instance, and user interaction associated with the workflow. For example, the developer 206, through changing the workflow, may add or delete steps in the workflow, or make other changes related to data used by the workflow. Other types of changes can include, for example, specific user roles who are to interact with steps in the workflow and the specific information and/or forms of interaction. These types of changes are to be stored in the workflow template 110.

At 304, a mode associated with the system is determined, the mode being a developer-ON mode or a developer-OFF mode. The workflow system 202, for example, can determine if a mode associated with the developer 206 is developer-ON or developer-OFF.

At 306, the workflow template is updated using the patch, including using mode-dependent actions based on the determined mode. For example, referring to FIG. 1, the workflow template 110 can be updated, such as in the following steps.

At 308, execution of workflow instances of the workflow is blocked. The workflow system 202, for example, can prevent workflow instances 212 from being executed, e.g., using database-level locks 214 described above with reference to FIG. 2B.

At 310, deployment of the updated workflow template is allowed. The workflow management system 101, for example, can deploy the updated version of the workflow template 110.

At 312, starting of new workflow instances during the deployment is allowed. For example, the workflow system 202 can start new workflow instances 212 using the updated version of the workflow template 110. At this time, different actions can be taken depending on, for example, which mode is signaled or identified by the developer tool 204.

At 314, the mode is determined to be developer-ON mode. When the mode is developer-ON, for example, steps 315-318 can occur.

At 315, execution of new workflow instances is unblocked. For example, new workflow instances 212 are allowed to start.

At 316, execution of new workflow instances is unblocked. For example, the workflow system 202 can unblock execution of workflow instances 212 associated with the updated version of the workflow template 110.

At 318, execution of existing workflow instances is continued with the newest workflow template patch version, no matter on which patch version the workflow instances originally have been started. The workflow system 202, for example, can continue the execution of workflow instances 212, some of which have been started with previous versions of the workflow template 110, and some of the workflow instances 212 have been started with the updated version of the workflow template 110.

At 320, the mode is determined to be developer-OFF mode. When the mode is developer-OFF, for example, steps 321-323 can occur.

At 321, execution of new workflow instances of the workflow is blocked using double handshake method. For example, new workflow instances 212 are not allowed to start.

At 322, continued execution of existing workflow instances associated with the latest patch version of that workflow template is permitted. For example, the workflow system 202 is free to allow the execution of new workflow instances 212.

At 323, the continued execution is forbidden of existing workflow instances associated with an older patch version of the workflow template. For example, workflow instances 212 are stopped if they are executing using the older version.

In some implementations, when the determined mode is the developer-OFF mode, the method 300 further includes receiving an input to suspend workflow instances prior to updating and deploying the workflow template. As an example, the developer 206 can use an interface in the developer tool 204 to suspend workflow instances 212.

In some implementations, when the determined mode is the developer-OFF mode, the method 300 further includes resuming execution of suspended workflows upon completion of updating and deploying the workflow template. As an example, the developer 206 can use an interface in the developer tool 204 to suspend workflow instances 212.

In some implementations, suspending workflow instances and resuming execution of suspended workflow instances includes using flags associated with the workflow template, the resuming including periodically checking the flags by a workflow manager. Referring to FIG. 2C, for example, flags 216 and 218 (e.g., set through the developer tool 204) can be used by the workflow system 202 to suspend or resume workflow instances 212, respectively.

In some implementations, the method 300 further includes receiving temporal information identifying a time at which the workflow template is to be updated and deployed and delaying the updating and deploying of the workflow template until the identified time. For example, through the developer tool 204, the developer 206 can specify a specific date and time for deployment of a new version of the workflow template 110. The specified time, for example, may be after hours or a time scheduled to coincide with other business process activities or business requirements.

Lock-Free Execution of Workflow Instances

It is a major non-functional requirement for a workflow management system (WMS) such as the workflow system 202 to provide good and reliable performance under high load. For example, under a high load, a WMS can process a large number of workflow instances. As a consequence, the WMS needs to be designed in a way to provide good scalability attributes. In some implementations, intended performance typically can be achieved using massively parallelized processing of workflow instances, such as by introducing multiple actors on workflow instances. However, in this situation, the WMS must ensure that no conflicts occur during processing. For example, two agents processing the same workflow instance at the same time (and without protection) can lead to severe issues such as data inconsistencies.

Existing workflow management systems may try to solve this kind of issue by introducing sophisticated locking strategies. In its simplest form, a workflow instance can be locked before it is processed by an agent. As a result, processing may be allowed only if the agent is able to acquire this lock. Using that mechanism, a second agent will not start processing the same workflow instance until the lock has been released by the first agent. However, locking is a major bottleneck when it comes to good performance and especially scalability behavior of a WMS. The higher the degree of parallelization (e.g., the number of agents used), the more severe the bottleneck of locking will impact the performance. As all agents typically have to select the workflow instances to process from a shared data store, the situation that one agent picks up a process instance that is already processed by another one will significantly increase. Consequently, agents may spend increasingly more time on picking up workflow instances which are already in processing and waiting for locks.

This document describes a lock-free execution of workflow instances with which a WMS can increase its scalability capabilities significantly. This can be achieved by ensuring that exactly one agent is allowed to process a workflow instance. The WMS, for example, can serve as the central instance that distributes the workflow instances among all agents.

In some implementations, to avoid massive locking on workflow instances during processing, a pattern can be applied such that exactly one agent is responsible for processing a certain instance at any time of the instance lifecycle. In typical WMS implementations, an in-memory database management system can offer facilities to run logic asynchronously in the background. These capabilities can be provided as part of a job framework that allows a WMS to execute logic that processes started and running workflow instances. At first, a particular workflow instance can be started synchronously by an application outside the WMS or by a human being using some application facilities. However, this only creates an initial token associated with the workflow instance. The initial token, for example, can be taken by a job executor scheduled via the job framework for further processing. Processing can include, for example, moving the token(s) from one process step to another process step, e.g., while manipulating the state of the workflow instance. It can be the responsibility of the executor to further process the workflow instance, and no other agent can be allowed to change the state of the workflow instance.

Figure 4:
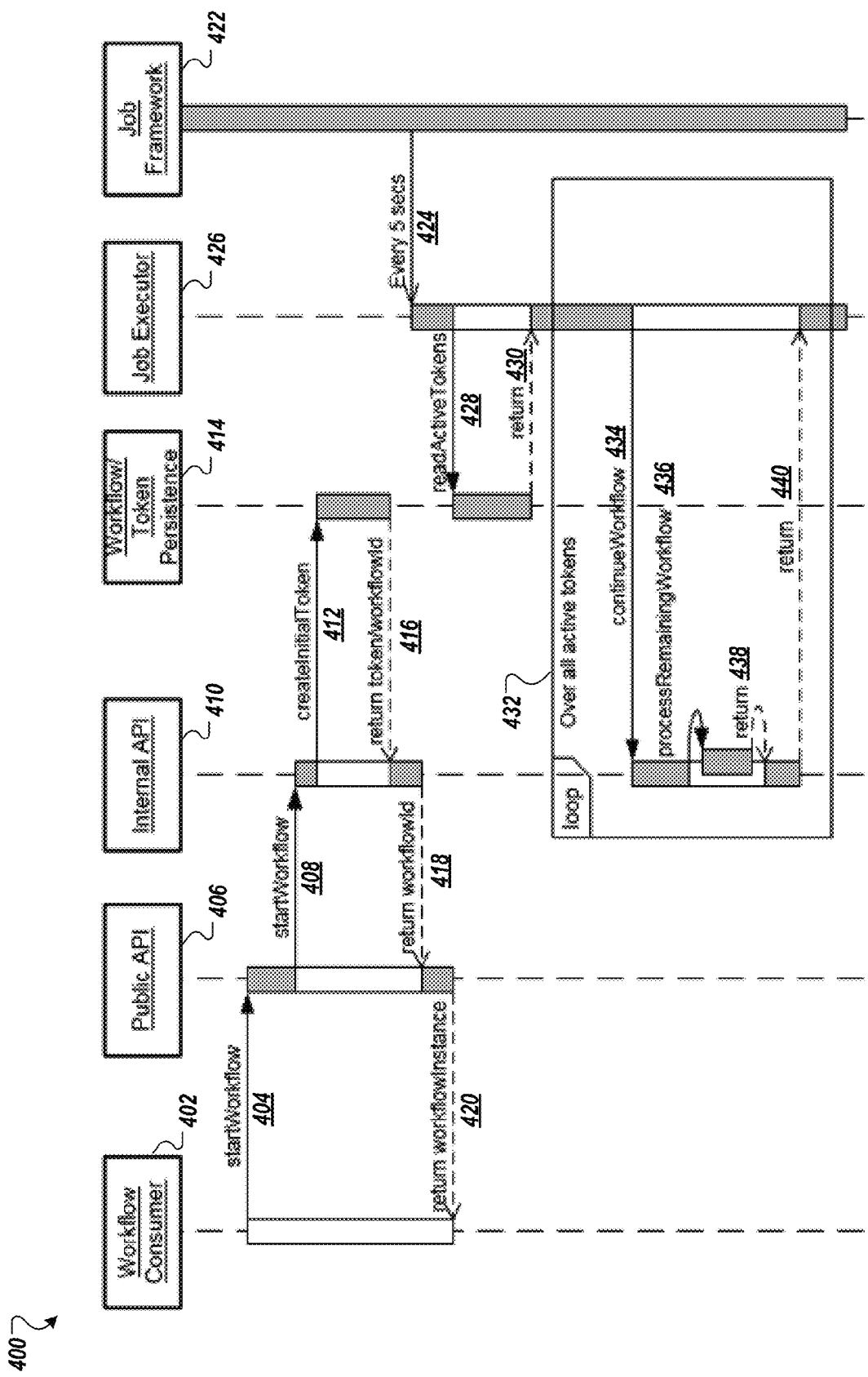
FIG. 4 is a swim lane diagram of an example process for processing workflow instances, according to an implementation.

FIG. 4 is a swim lane diagram of an example process 400 for processing workflow instances, according to an implementation. For example, using a workflow manager, a workflow can be tokenized using the process 400. The process 400 can start, for example, when a workflow consumer 402 starts a workflow (404), e.g., initiating a public API 406. The public API 406 can forward a request to start the workflow 408 to an internal API 410. The internal API 410 can create an initial token (412) for storage in workflow token persistence 414 (e.g., a persistent database). Once the initial token is created, a token/workflow ID is returned to the internal API 416, which in turn returns the workflow ID (418) to the public API 406, which in turn returns the workflow instance (420) to the workflow consumer 402.

External to the workflow manager, a job framework 422 can process tokens associated with the workflow instance. For example, the job framework 422 can periodically (e.g., every five seconds) initiate (424) a job executor 426. When initiated, the job executor 426 can read active tokens (428), e.g., from the workflow token persistence 414 from which plural tokens can be returned (430). At this time, a loop 432 (e.g., over all read tokens) can be entered in which the tokens are processed. For example, for the current workflow instance, the workflow continues (434), and the remaining workflow is processed (436) and results are returned (438). When all tokens in the workflow instance have been processed, processing can return (440) to the job executor 426.

In some implementations, the WMS can spawn a number of homogeneous executors, each of which can act as agents to process workflow instances. Theoretically, each executor can be able to process every workflow instance. Therefore, the WMS can use a specific distribution strategy to assign each workflow instance to a dedicated executor. The executor itself can be limited to pick up only workflow instances that are assigned to the executor. In some implementations, the distribution strategy can use a simple modulo operation that includes several input parameters. The concrete parameter values, for example, can be unique to an executor and can be injected by the WMS when starting the executor. In this way, the WMS can coordinate control over all executors to avoid conflicts.

Figure 5:
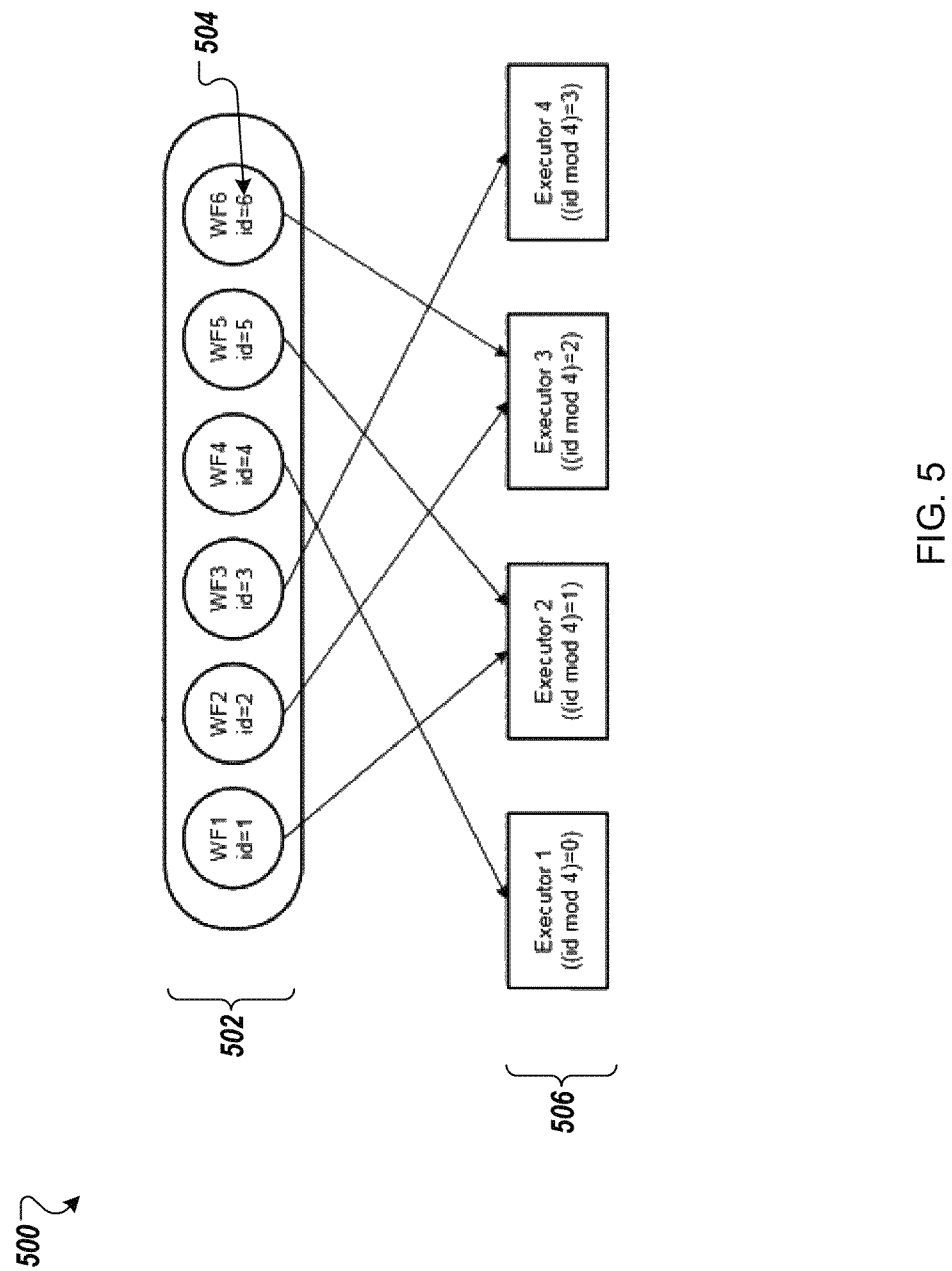
FIG. 5 shows an example process for allocating workflow instances to specific executors, according to an implementation.

FIG. 5 shows an example process for allocating workflow instances to specific executors, according to an implementation. For example, workflow instances 502 can be associated with workflows having unique workflow identifiers 504 (e.g., ID=1, 2, 3, 4, 5, and 6 for workflows WF1, WF2, WF3, WF4, WF5, and WF6, respectively). The IDs can be used, for example, to select unique executors 506 that are selected based on the IDs. For example, each of the executors 506 can be responsible for workflow instances that evaluate "TRUE" on a specific formula or other condition. In some implementations, an executor 506 can process a workflow instance if and only if the following formula holds true:

$$(\text{Unique\_workflow\_ID mod Number\_of executors})=\\(\text{Current\_executor\_number}-1)$$

With this distribution strategy in place, the WMS can ensure that a specific workflow instance will not be picked up by two different executors 506. Consequently, acquisition of a lock is not required before processing the workflow instance.

Nevertheless, there can be a few cases where external agents have to interact with a workflow instance. One common situation in workflow management systems is that an administrator may need to suspend or resume a workflow instance. This typically can be done as part of a support activity, e.g., if a workflow instance has run into an erroneous state so that the executor is not be able to drive it further. Such administrative actions can manipulate the state of the workflow instance. In order to provide lock-free execution, a double handshake between the job executor and the administrative action can be used. Within the double handshake procedure, for example, the administrative action can signal its desired change on the workflow instance (e.g., to suspend the workflow instance). This can occur to the WMS respectively to the executor responsible for the workflow instance. During the next run of the executor, the executor can pick up this signal and finally manipulate the state of the workflow instance by moving it into the desired state (e.g., suspended).

Though this approach involves the introduction of a lock, e.g., to avoid conflicts between the administrative action and the executor, the introduction of the lock may be insignificant with regards to scalability behavior. For example, administrative actions may typically be executed very rarely, so introducing a locking mechanism can be tolerated, especially due to the fact that the administrative action will only send a signal. This can reduce the time required to hold a lock, which can block workflow execution on this particular instance to a bare minimum.

The use of lock-free execution of workflow instances can provide advantages over common systems. For example, an existing WMS may use sophisticated locking mechanisms to avoid conflicts when parallelizing workflow execution. Such locking mechanisms can have a negative impact on performance and the scalability capabilities of the system. However, with lock-free execution of workflows, these negative impacts can be eliminated. Further, a WMS using lock-free execution of workflow instances can provide better scalability behavior.

Figure 6:
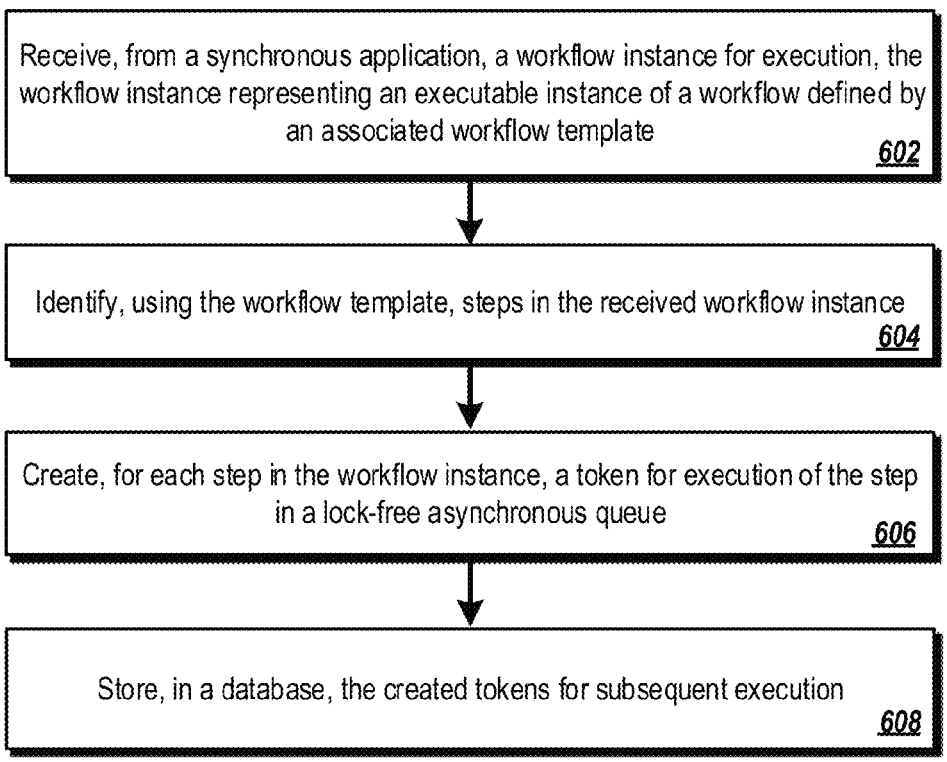
FIG. 6 is a flowchart of an example method for using tokens for the execution of a workflow, according to an implementation.

FIG. 6 is a flowchart of an example method 600 for using tokens for the execution of a workflow, according to an implementation. For clarity of presentation, the description that follows generally describes method 600 in the context of FIGS. 1 and 4-5. However, it will be understood that the method 600 may be performed, for example, by any other suitable system, environment, software, and hardware, or a combination of systems, environments, software, and hardware as appropriate. For example, the workflow system 100 and/or its components can be used to execute the method 600.

At 602, a workflow instance is received from a synchronous application for execution, the workflow instance representing an executable instance of a workflow defined by an associated workflow template. For example, the workflow controller 102 can receive a workflow instance 112 (e.g., an instance of the workflow template 110) for a workflow to be executed. The workflow instance 112 can be provided (or identified for execution) by a user at the client device 106. For example, the identified workflow may be one of the stored workflows 113.

At 604, using the workflow template, steps are identified in the received workflow instance. For example, the workflow controller 102 can retrieve information about the workflow from the workflow template 110, which may be stored in one or more tables in a relational database. The workflow template 110 can include information, for example, identifying specific steps in the workflow, data used in the workflow, and specific user interactions associated with the workflow.

At 606, for each step in the workflow instance, a token is created for execution of the step in a lock-free asynchronous queue. The workflow controller 102, for example, can create a token for each of the steps in the workflow. In some implementations, the tokens can be created according to the description of FIG. 4.

At 608, the created tokens for subsequent execution are stored in a database. For example, the workflow controller 102 can store the created tokens for the workflow instance 112 in the database of workflow tokens 115 (e.g., in table entries).

In some implementations, the method 600 further includes executing the workflow instance, including accessing the stored tokens from the database. For example, the workflow controller 102 can read and execute tokens from the database of workflow tokens 115. For example, executing the workflow instance can include periodically identifying a set of active tokens and executing the tokens from the set of active tokens in a loop, as described with reference to FIG. 4. Execution of the workflow instance 112 can include, for each token, executing a particular token, marking the token as being executed, and identifying subsequent tokens to be executed.

In some implementations, each workflow is assigned a unique workflow identifier (e.g., workflow identifiers 504). Also, executing each workflow instance (e.g., workflow instance 112) can include determining, using the unique workflow identifier assigned to a particular workflow, a particular executor (e.g., executor 506) from N (e.g., 4, as shown in FIG. 5) plural executors, and executing tokens associated with the workflow instance (e.g., workflow instance 112) using the determined particular executor of the workflow instance. In some implementations, the unique workflow identifier is a positive integer, and determining the particular executor includes using a function to determine an executor number (e.g., 1, 2, 3, or 4). Further, herein determining the particular executor includes selecting the particular executor using the determined executor number. In some implementations, the function is a modulo function using the unique workflow identifier modulo N (e.g., N=4).

Record-Level Security Access in In-Memory Database

Runtime and contextual data of workflows can be stored in tables which are not meant to be accessed directly by users of a WMS. Instead, a layer (e.g., provided on top of the data) can provide access to the data, including, for example, restricting visibility of workflows for certain user roles. Example user roles include, but are not limited to, a super administrator, an administrator for a specific workflow template, and an end user. In some implementations, programming models of in-memory databases include the concept of using privileges to filter out rows based on conditions assigned to a specific user role. Such privileges can be dynamically configured to views wrapping underlying tables. Filter conditions can be automatically applied to the query execution based on a current user's role assignments. Assuming that each table row can be associated to a single workflow instance, these types of privileges can be used in a WMS on an in-memory database system.

The runtime data can be stored in tables, e.g., in the same tables that store all workflow instances of all templates in all versions. For example, the schema of the runtime data can be identical for each workflow template. The data is needed to process a workflow instance, e.g., for current state determination, token determination, or other purposes. These uses can be referred to as a "shared persistence." The runtime can mainly persist technical details. By default, the data is not accessible as long as no user gets the authorization on the views. Instead, authorization can be granted by privileges, which are generated as being template and version dependent, e.g., to help ensure data separation on a template/version level. Otherwise, it can be possible for a user to define and use their own privileges. Context data can normally include a subset of application data, which may be more of interest from security point of view. This context persistence can be generated for each template version, which can ensure a hard context data separation between different templates and template versions.

By using the concept of privileges in an in-memory database, security checks can be performed on a deep-seated software layer, directly on the database. In-memory database security checks can reduce the amount of data to be transferred, because only the data for which the user is authorized is transferred. In-memory database security checks can also improve security because the authorization check is deeply coupled to the query and does not depend on API calls.

In some implementations, in order to get access to either runtime or context data, a user needs two privileges: an object privilege to access the view as such, and row-level privileges to get access to specific rows. In some implementations, row-level privileges can be unrestricted to all rows or may be restricted to only parts of rows.

Figure 7:
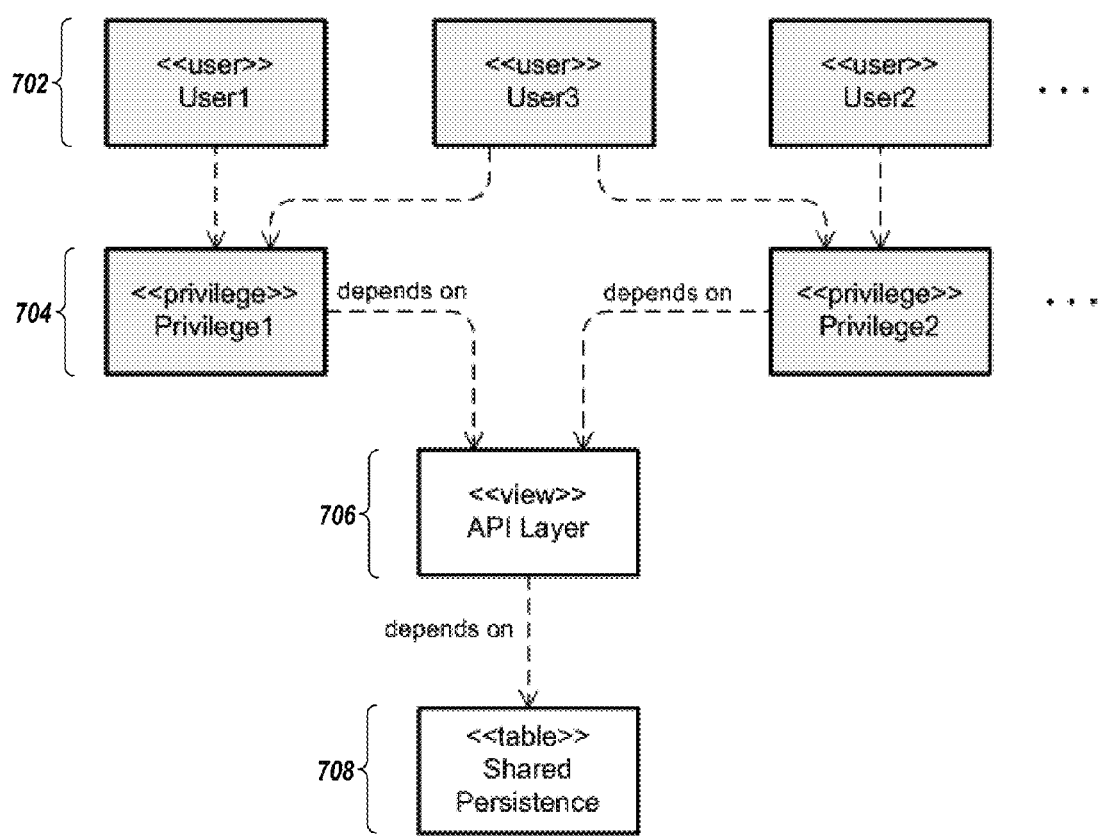
FIG. 7 is a diagram showing example user privileges and their dependencies, according to an implementation.

FIG. 7 is a diagram showing example user privileges and their dependencies, according to an implementation. For example, users 702 have privileges 704 that depend on privileges granted at an API layer 706, which in turn depend on privileges defined at a shared persistence layer 708.

As privileges depend on a view (rather than the other way around), the privileges also offer an extensible and flexible mechanism to provide different views on the same dataset for different users. For example, applications can create their own privileges in order to restrict access to workflows that are valid in a specific application context in which the user is allowed to work. Further, generation of a workflow template can automatically create privileges that provide access to, and visibility on, the data associated to the respective workflow template.

For tables and views that are shared among all workflow templates, the corresponding object privilege can be granted via a role that is shipped with the WMS. However, access to the data returned by the view can be granted based on generated privileges and roles for each workflow template. One potential exception to specific role-based privileges is the use of a super administrator role, e.g., which provides access to data of all workflow instances.

Figure 8:
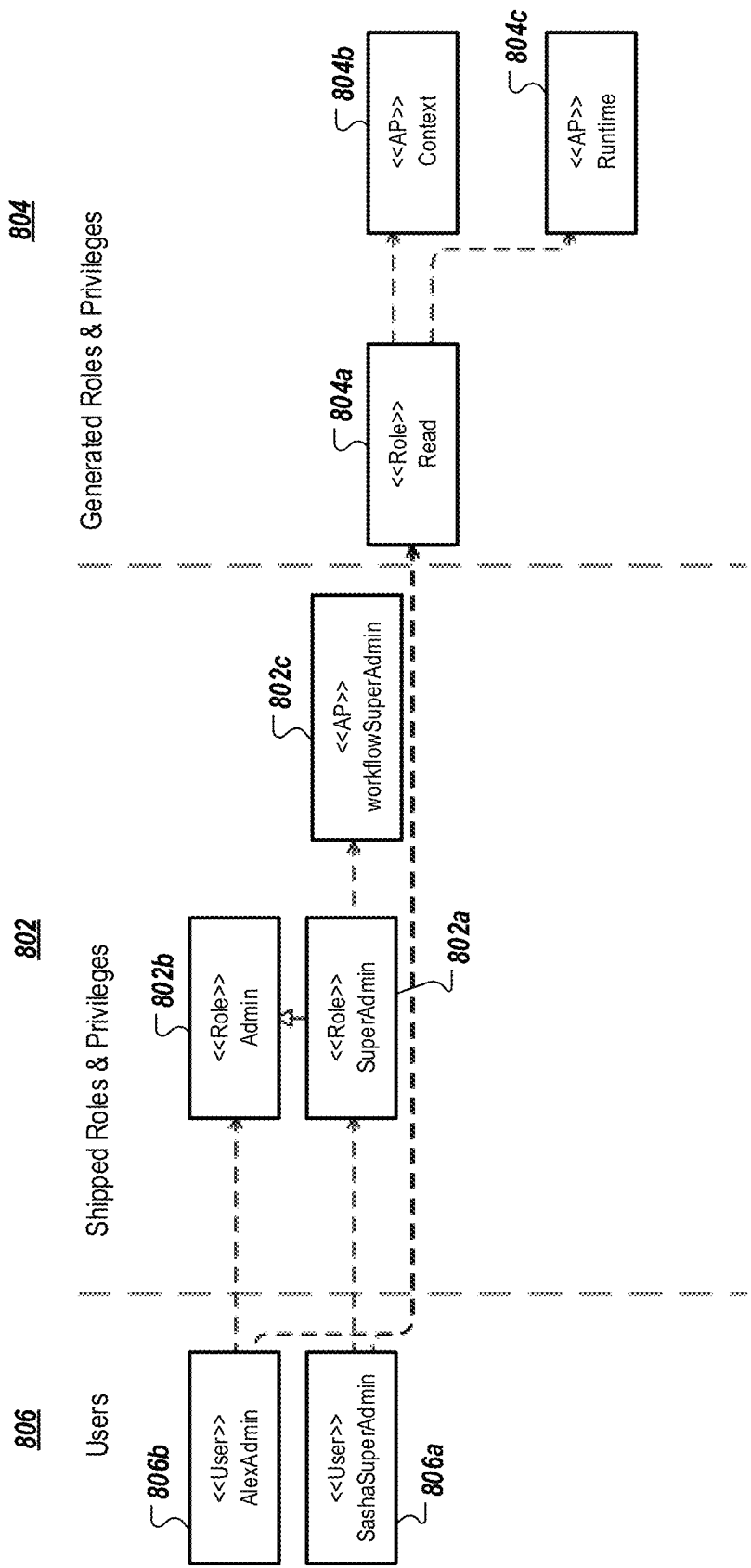
FIG. 8 is a diagram showing example user privileges used to create in-memory database privileges for users, according to an implementation.

FIG. 8 is a diagram showing example user privileges 802 used to create in-memory database privileges 804 for users 806, according to an implementation. For example, from the FIG. 8, it can be derived that a super administrator user 806a (e.g., "SashaSuperAdmin") with a shipped super administrator role 802a gets access 802c to data of all workflow instances via the shipped role and privilege. An administrator user 806b (e.g., "AlexAdmin"), who is only an administrator for a specific workflow template, only gets access 802b for the object privileged from the shipped "Admin" role. The administrator user 806b further relies on the generated "Read" role 804a to get access to the workflow specific data from the shared persistence, e.g., making it unnecessary to grant the object privilege. The super administrator user 806a has context and runtime privileges 804b and 804c, respectively, based on the shipped access 802c.

For context persistence, a privilege and role can be generated, which can be assigned to users having to read the workflow template specific context data. Here, both object privileges and privileges for seeing the data have to be included, as context persistence is template-specific by nature.

When it comes to write access on the shared or context data persistence of a WMS, the same privilege concept can be re-used. For example, if a user tries to manipulate a workflow instance or template data, a check is performed to determine whether the user is allowed to access the corresponding entity. This is again done based on the above described concept privilege, e.g., assuming that if the user is allowed to see the data, then the user is also allowed to manipulate the data.

In some implementations, a WMS on an in-memory database system can use a dedicated database user for controlling application users. Use of a dedicated database user is different from other WMSs in which data access is done using a generic database user that is shared between all application users. This prevents the ability to push the security concept down to the database, but needs to be handled by the application layer. This has an additional side effect in that the execution user is the same as the one having triggered the workflow. As such, a fine granular authorization assignment can be supported, and there is no need for a technical processing user with super rights. In some implementations of a WMS on an in-memory database system, there is no separation between application and database users. Rather, the execution user is pushed down to the database so that privileges and permissions can be evaluated on the lowest possible layer.

Figure 9:
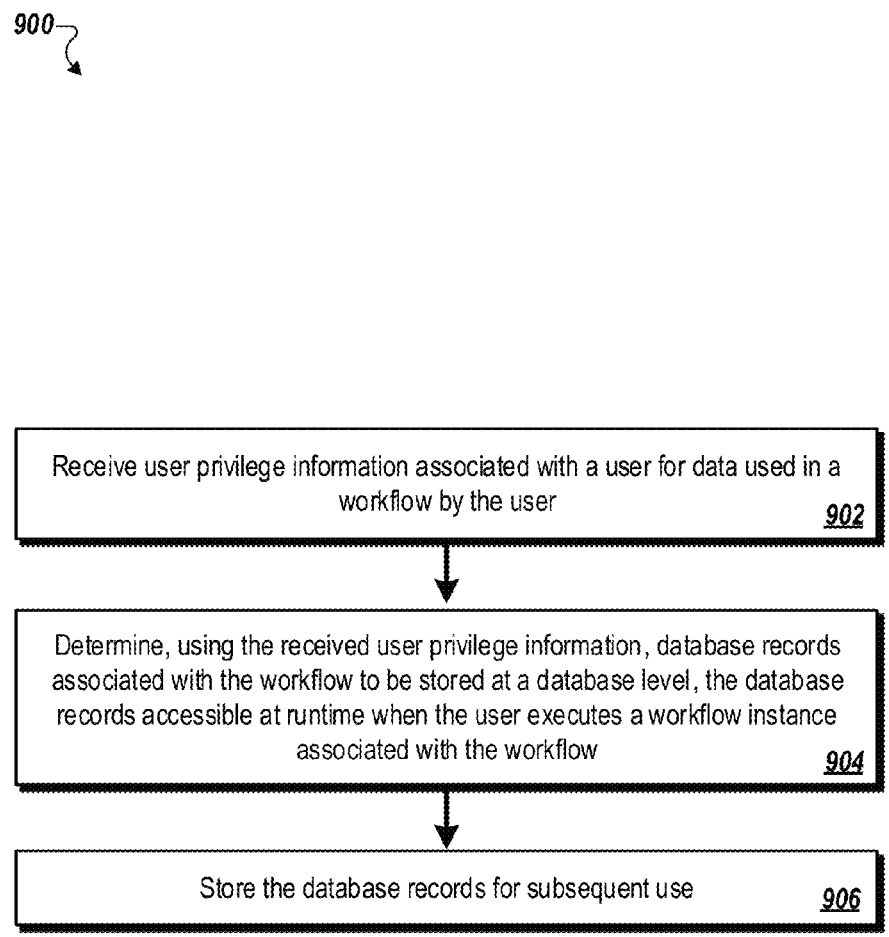
FIG. 9 is a flowchart of an example method for using record-level security access in an in-memory database, according to an implementation.

FIG. 9 is a flowchart of an example method 900 for using record-level security access in an in-memory database, according to an implementation. For clarity of presentation, the description that follows generally describes method 900 in the context of FIGS. 1 and 7-8. However, it will be understood that the method 900 may be performed, for example, by any other suitable system, environment, software, and hardware, or a combination of systems, environments, software, and hardware as appropriate. For example, the workflow system 100 and/or its components can be used to execute the method 900.

At 902, user privilege information is received that is associated with a user for data used in a workflow by the user. For example, the workflow management system 101 can receive, from the client device 106, information associated with user access to certain data, e.g., including business objects and particular rows and/or columns associated with the business objects. In some implementations, privileges can be granted at the row (e.g., record) level. Privileges can also be granted on the column level, e.g., for certain fields in records.

In some implementations, user privileges are granted, at least in part, based on an application with which the user is interfacing. For example, users using an Application A may have different privileges than users using an Application B that uses the same data.

In some implementations, the database records identify user privileges at a user role level, and determining that the database records indicate user privileges associated with the data includes determining that the user has a particular user role consistent with user privileges stored for a particular user role. For example, a user who has a supervisor role can have privileges that are associated with that role, which may be more or fewer privileges than privileges assigned to other roles.

At 904, using the received user privilege information, database records associated with the workflow and that are to be stored at a database level are determined. The database records are accessible at runtime when the user executes a workflow instance associated with the workflow. The security module 118, for example, can process the received user privilege information in order to generate table entries for use at runtime.

At 906, the database records are stored for subsequent use. For example, the security module 118 can store the database records in the security settings 116.

In some implementations, the method 900 further includes operations for using the stored user privilege information. For example, during execution of the workflow instance, a request for access to data in the workflow instance can be received. The stored user privileges are accessed at the database level. A determination is made (e.g., by the security module 118) that the database records indicate user privileges associated with the data. If the determination indicates that the user has access, then user access to the data associated with the request can be provided.

Leveraging In-Memory Platform Artifacts

This section describes the practice of leveraging in-memory platform artifacts, e.g., to overcome the general inefficiency of common workflow management system implementations. For example, common workflow management systems (WMSs) use a database to persist the state of processes. Using this technique, for example, data is technically transferred between application servers running the WMS and the database through structured query language (SQL) application program interfaces (APIs) such as Java Database Connectivity (JDBC). In WMSs that are so implemented, data flow and transformation management components, e.g., providing the model-side support for describing inputs and outputs of workflow steps, are typically supported at runtime through the WMS itself. Specifically, the data flow and transformation management components typically run on the application server, e.g., using SQL APIs. Using this approach, moving data between the database server and the application server may be inefficient and costly, especially in situations using large data sets. For example, data has to be transferred to the application server, transformed at the application server, and the results transferred back to the database server. This technique can induce transformation and communication efforts, which can often inhibit the use of the WMS for technical tasks that require high performance.

WMSs are commonly used for optimizing the way human users are integrated into business processes, but are often also used for automation of technical, recurring tasks. Due to these two aspects, WMSs represent systems with high transactional (OLTP) volume. However, as WMSs focus on integration of human users as well, WMSs usually also induce high analytical volume, e.g., in monitoring tools or in separate data warehouse systems. This can occur because execution times (e.g., wall clock times) of workflows are typically highly dependent on optimal guidance of users and therefore are a good target for process optimizations and process monitoring. Therefore, technical optimizations applicable both to transactional as well as analytical workloads can remove blockers for using WMSs in areas where WMSs cannot be applied due to limited performance.

WMSs can have specific problem areas, e.g., when used in guiding users in their work on data sets. For example, the data sets are typically protected, so that only authorized personnel are allowed to read and write data sets to which they are assigned (e.g., authorization is data-dependent). Data-dependency concerns are usually associated with the rows of table-based artifacts in a DBMS, not the table-level access itself. That means that personnel authorization can be described through complex selection criteria.

In common disk-based DBMSs, respective authorization checks can be a costly operation, such as when the checks have to be conducted on each and every access. For example, the checks can require indices and disk accesses for the operations to work efficiently. Due to row-based access being typical, all columns necessary for authorization criteria can require separate indices for efficient processing, or else all rows have to be read and analyzed.

In some implementations, WMSs can be used to execute consistent approval processes on data sets or business objects, e.g., requiring human interaction. Such processes may typically run as follows. For example, as soon as a business object reaches a certain state, the business object can run through an approval process before the business object can be put into actual, productive use. This means that changes to business objects can often trigger workflows. In common WMSs, a surrounding or additional application component is typically required to notify the WMS of the changes, leading to eventual execution of the workflow. Information included in the notification regarding who must approve the data set change is often, in itself, data-dependent. Further, this information must be kept up-to-date, in case there is a time delay between data set change and taking the approval decision through humans.

In standard DBMSs, this information is usually materialized, e.g., copied to secondary tables, during data set changes, with the use of database triggers. However, using this practice, organizational or approval responsibility changes may not be easily reflected in the materialized, derived data, e.g., leading to outdated or inconsistent data. These inconsistencies may be common because usual WMS and database system architectures typically promote designs based on copies of data, due to the WMS being a cross-application tool that has to integrate multiple data stores.

In standard WMSs, approval tasks are usually displayed to the user through so-called "inboxes," e.g., in which tasks to be executed by the owner of the inbox are listed. The lists being displayed in an inbox are usually based on the materialized data, so potentially outdated data may be displayed, or personnel who are recipients of the email may no longer be responsible for the approval. This can lead to an unpleasant user experience, e.g., when a user is told about not being authorized for a task, which can lead to a higher number of help desk requests or other problems. Therefore, an up-to-date view on the business data, instead of materialized, derived data, is important for consistency reasons.

Scheduling is a consideration, as WMSs typically consist of services executing background (or automated) and human interaction parts. The background execution can be built on at least two paradigms. For example, there may be no central scheduler, or there may be a central scheduler.

When there is no central scheduler, for example, the workflow execution can be seen as a chain of calls, where event entry points call a central execution method or procedure that executes flow logic and application logic. As soon as a chain of calls is done, for example, no further tasks are ready for execution, and the chain can end. Continuation, e.g., waiting for an outside event, can only happen if the entry points call the central execution method again. Due to this decentralized design, workflow execution can stop, if the responsible event entry point is disabled or out of order. The event entry point has to be recognized as the cause of the stop, which may be potentially difficult to do. In this approach, it can be difficult to conduct overarching optimizations, because of the decentralized knowledge.

When there is a central scheduler, e.g., implemented as a program or an application component, the central scheduler can take over the analysis of whether there are new events to be processed. In general, this is a more pull-oriented and centralized design, where the scheduling can be administered and optimized centrally. The central scheduler, on behalf of an administrative user, can control the execution more efficiently and effectively, because of the scheduler's potentially omniscient view on the tasks at hand. For this purpose, a workflow controller may typically be a component being called by the scheduler.

Scheduling mechanisms may often be part of application platforms, so that in many cases, the central scheduler approach can be taken. These platforms can usually provide a scheduling framework, which the WMS can make use of through APIs to schedule the execution of the workflow controller. In application systems based on standard DBMSs, for example, the scheduling optimization option (e.g., that is possible due to the omniscient central scheduler view) typically cannot be used, because it can involve costly OLAP analysis. The optimization task can usually be delegated to human administrators and their access to dedicated OLAP platforms, working on copies of the data that are often outdated. This can lead to inaccurate optimization results due to delays resulting from the human interaction involved. This and other problems can be resolved to a large extent on in-memory platforms by using appropriate artifacts provided by the platform.

Figure 10:
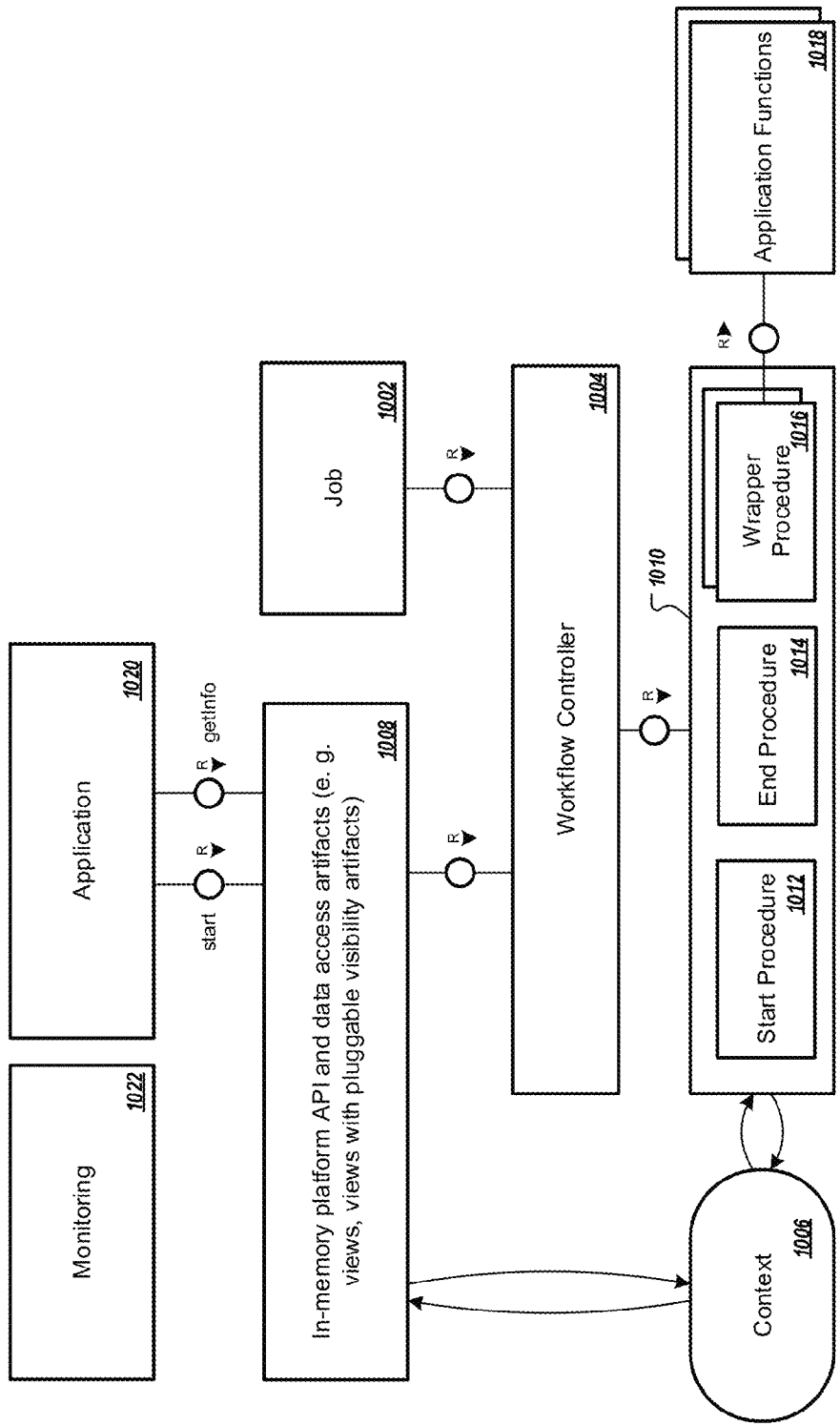
FIG. 10 is a diagram of an example architecture for using in-memory platform artifacts, according to an implementation.

FIG. 10 is a diagram of an example architecture for using in-memory platform artifacts, according to an implementation. A job 1002 represents a job created, e.g., through a scheduling support function of an application server. A workflow controller 1004 represents a workflow controller component of a workflow management system running on the application server or enhanced in-memory platform. A context 1006 and an API 1008 (e.g., accessed by an application 1020 or during monitoring 1022), respectively, represent the context data tables and suitable encapsulations, as described below. An encapsulation 1010, including at least one start procedure 1012, at least one end procedure 1014, and at least one, but typically many, wrapper procedure 1016, collectively represent components of workflow control in association with application functions 1018. For example, the start procedures 1012 and the end procedures 1014 work on the workflow data model. The wrapper procedures use application functions, as that is what they are wrapping. The start procedure 1012 and the end procedure 1014, respectively, can include information of what the tokens associated with the workflow instance need to do. Wrapper procedures 1016, one for each task, are also created by the workflow controller 1004. Every artifact in the workflow model ends up in an executable that is encapsulated in the encapsulation 1010. In this way, execution of the workflow instance is implemented in the database. This is in contrast to the workflow controller 1004, which can be implemented in code (e.g., a scripting language or other language). In some implementations, the workflow controller 1004 can be implemented inside the database along with the encapsulation 1010. The procedures 1012-1016 execute in the database, e.g., reading data from the context 1006 as needed, and storing data in the database.

In some implementations, artifacts can be generated or created specifically for the purpose of a workflow, e.g., the artifacts can be derived from a workflow template and transferred to a format required by the platform. Deriving the artifacts can include using SQL data description language (DDL) statements, creating database tables, views and other artifacts, files for upload or import into the platform artifact management system, or other approaches with a "design, compile, deploy" cycle. The workflow template can provide sufficient semantic information to enable non-trivial optimization strategies. For example, the workflow template can include data model references, data model descriptions, control flow descriptions, data flow and transformation descriptions, information about background services to be called and about tasks for human users respectively about integrating user task management systems. The workflow template can also include information associated with key performance indicators (KPIs) that the system designer wants to optimize for. The information can include, for example, latency considerations (e.g., to reduce wait times for users) versus system load (e.g., to reduce execution of unnecessary system tasks). In some implementations, the Business Process Modeling Notation (BPMN), for example, can be used as a common workflow template containing such information or enabling storing and exchanging the information.

The workflow template can provide the basis for the derived artifacts, which in turn can implement the technical support for workflow execution (e.g., runtime, executing workflow instances). At least two major groups of artifacts can be used, for example, including artifacts executed by a core in-memory database platform and artifacts executed by an application system or enhanced in-memory platform. Strategies are now described that can be used for efficiently implementing a WMS on an in-memory platform.

Subsection: Data Flow and Transformation Management

In some implementations, data flow and transformation management can be mapped to efficient data access and manipulation artifacts of the in-memory platform. For example, this can be done descriptively using SQL DML statements or imperatively using SQL based script languages, both of which are common parts of DBMS. As such, execution occurs directly on the database server respective in-memory platform. The data transfer between application server or enhanced database server and database server can therefore remain minimal. Although the application server part may serve primarily as a driver/controller orchestrating the in-memory artifacts, any heavy-weight data-focused operation is run through the in-memory platform artifacts only. This can work efficiently because the controller will usually only have to work on two typically small datasets: the workflow model information and workflow runtime instance information. For example, the workflow runtime instance information can describe the current progress information of the workflow, e.g., which steps have been reached and which ones are next.

Figure 11:
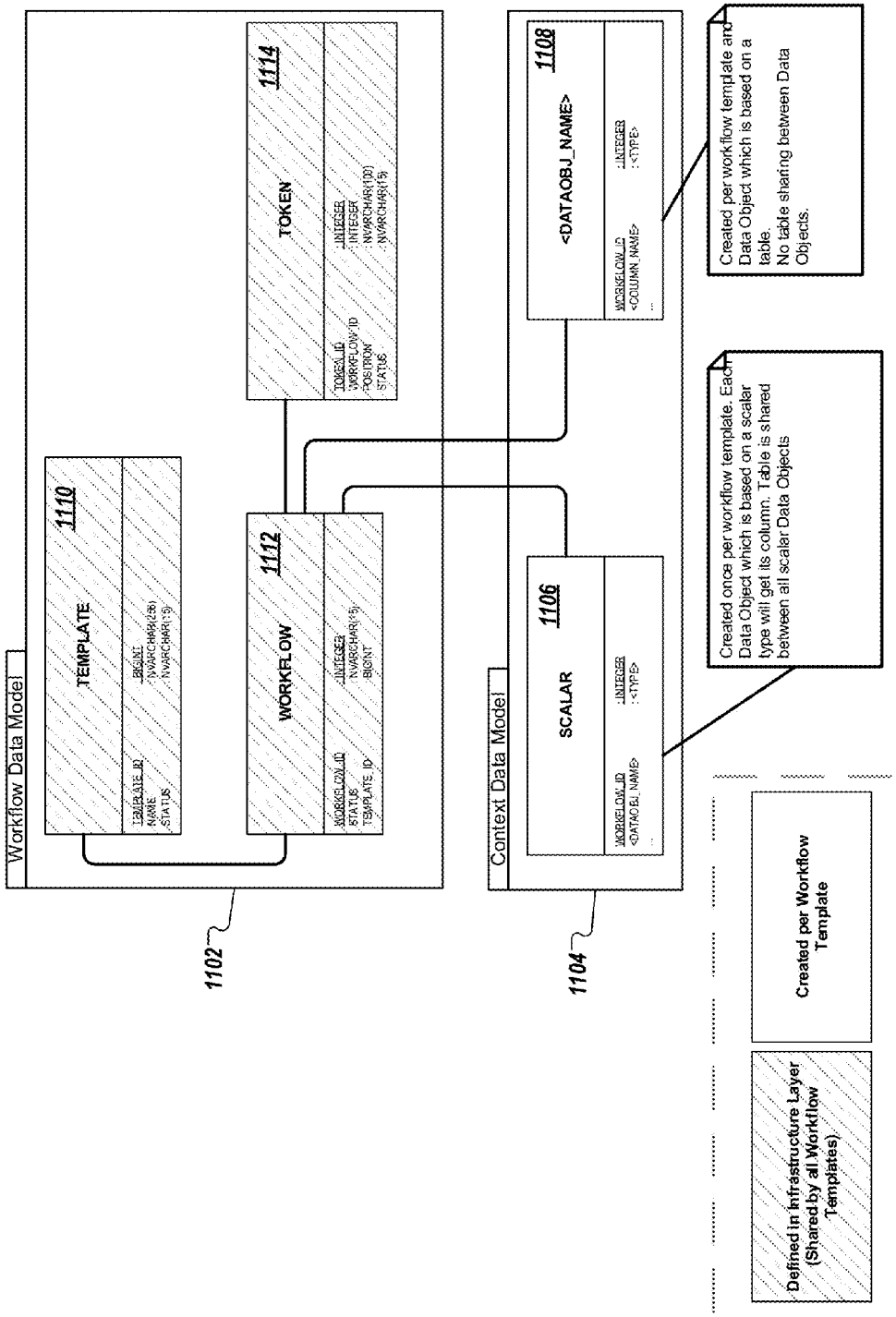
FIG. 11 is a diagram of example workflow artifacts that are automatically generated as tables in a database, according to an implementation.

FIG. 11 is a diagram of example workflow artifacts that are automatically generated as tables in a database, according to an implementation. For example, FIG. 11 shows a sample database design used in workflow management. A workflow data model 1102 (e.g., a package named "Workflow Data Model") can be used by the workflow controller, for executing a workflow instance. Aspects that are specific to the workflow template (e.g., a synonym for a workflow model description) can include, for example, the data context on which it operates. For example, the data context can be defined in a context data model 1104 (e.g., a package) that includes separate entities, e.g., a scalar artifact 1106 and a data object entity 1108. Artifacts in the workflow data model 1102 can be used for executing the workflow. For example, a template 1110 can provide information about the workflow models supported by the system. A workflow artifact 1112 can provide information about instances instantiated from the models/templates. A token artifact 1114 can provide information about the progress of the control flow inside of such instances. This approach of deriving artifacts from the workflow data model 1102 can allow optimized access to these tables, as they are resident in the database. For example, the workflow artifact 1112 and the token artifact 1114 can represent artifacts on which many transactional data updates are executed. Further, the infrastructure nature of the artifacts 1112 and 1114 can provide optimization for respective load. For example, the artifacts 1112 and 1114 can be executed on row-based databases or, if the systems supports both row- and column-based accesses, the artifacts 1112 and 1114 can be configured to run in "row" access mode. The artifacts created for data flow and transformation management can include, for example, at least two types of artifacts: context data tables, and artifacts for reading/writing from/to the tables (e.g., so-called wrapper procedures).

Context data tables can represent persistent variables of a workflow runtime instance, e.g., storing intermediate results for retrieval at a later time. For example, due to the mapping of all WMS components to in-memory platform database artifacts, there is typically no application-server memory in which to store such intermediate results, so that these results have to be stored in database artifacts. Unlike common WMS implementations in application-servers, analytical queries can be executed at all times, e.g., using standard query languages such as SQL (versus non-standardized programming APIs in common WMS implementations). The usage of standard query languages can allow additional convenience artifacts to be created easily. For example, artifacts can expose the contents of the query results in different data formats, e.g., OData, XML, or JSON. In turn, the artifacts can significantly speed up the creation of user interfaces and other tools working on the data. Common WMSs, in contrast, may often store data in binary or other representations, e.g., using proprietary data formats, thereby increasing the cost of implementing such tools or even making implementation impossible for anybody else than the WMS vendor.

From a performance perspective, context data tables are typically inserted into, and rarely updated. As described above, context of a workflow is an important business design consideration for a workflow, as the context implicitly describes the input, output and progress of a workflow. This is especially true for data flow patterns that typically occur in workflows, such as receiving input data, transforming the data to another representation, and then iterating on items contained in that data, e.g., to derive further micro-transformations from the data. This means that, from phase to phase in that pattern, data is typically read and written, but not updated, whereas the progress of the workflow can be derived from whether certain data already exists for a workflow instance. Due to this monitoring benefit, analytical queries can occur much more often than inserts. Therefore, access to context data is a crucial performance benefit. In the overall concept of using artifacts described in this document, the artifact derivation step, based on the workflow model, can therefore optimize the context data artifacts for such analytical access, e.g., by using column-based accesses. However, the concept also allows the artifact derivation step to decide for row-based accesses. That decision could be the result of an analysis of the workflow model or based on a decision of the (human) workflow designer, typically persisted in the workflow model description.

The aforementioned concepts about context data based monitoring can apply on workflow infrastructure level also. For example, the progress of a workflow instance may be insufficiently described through the context data tables. Therefore, a WMS following the artifact techniques described herein can make use of further tables, e.g., describing the technical and possibly workflow model based progress of the workflow, using suitable data storage artifacts. This can commonly be called a "workflow log" or a "business log" of a workflow. A data storage artifact used for this purpose, such as on the infrastructure level, may look like the scalar artifact 1106 in the context data model 1104, e.g., containing fields describing the details of the progress taken by parts of the workflow. Performance aspects can apply similarly to the context data: e.g., the data being written once, per logical increment of a step, but read many times, so that optimizations for the analytical case are possible.

Wrapper procedures can be created, e.g., to adapt implementations of the application functions that are referenced in the workflow model description to the WMS environment. For example, the wrapper procedures can be implemented as native database functions, such as stored procedures. Application functions that are wrapped with these functions can provide input and output parameters. In the environment of the WMS, these parameters can be filled from the workflow variables, as specified with the help of the data flow and transformation management design-time component. It can therefore be the task of such wrapper procedures to take the context data of a workflow runtime instance, transform it suitably, provide the data to the application functions respectively, receive/read the data results, and store the data in the context data tables. If the application functions are as well implemented as native database functions, e.g., stored procedures, then the complete data and transformation management can be executed completely native on the database. This can minimize data flow between application server and database.

In some implementations, wrapper procedures can be implemented not only for application functions, but also for tasks related to the control flow described in the workflow model description, such as activities required when a workflow is started (e.g., "start procedures") or completed (e.g., "end procedures"). The specialized tasks of these functions can include the initial storage of data into the context tables in start procedures or finalization tasks on infrastructure tables (e.g., typically the token table in the workflow data model) in end procedures.

An example database design for context data tables is shown in FIG. 11, e.g., in the workflow data model 1102. For scalar (e.g., non-composite) variables of the workflow model description, for example, one composite database table can be defined. The table can contain data fields with suitable types for each of the variables, as well as one foreign key field (e.g., WORKFLOW ID) that references the instance of the workflow. With the help of this field, for example, the workflow controller can delegate the data retrieval and storage to the wrapper procedures, because the field is part of the workflow data model on which the workflow controller operates. This enables pushing data access and manipulation from the application server level to the database level. The workflow controller can also delegate operations on the workflow data model to the wrapper procedures, e.g., to update information on the progress of the workflow (e.g., in the workflow data model represented by the token artifact 1114).

Figure 12:
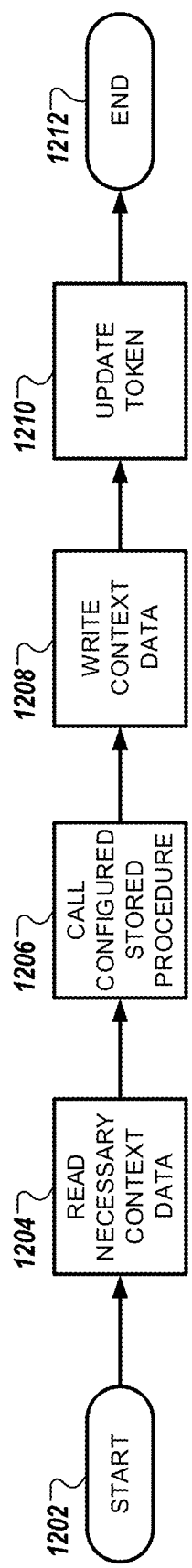
FIG. 12 shows an example sequence of tasks for a wrapper procedure, according to an implementation.

FIG. 12 shows an example sequence of tasks 1202-1212 for a wrapper procedure, according to an implementation. For example, after step 1202, when execution of the wrapper procedure can start, necessary context data (e.g., context 1006 data) is read at step 1204. At step 1206, for example, configured stored procedures are called, e.g., procedures 1012-1016 in the encapsulation 1010. At step 1208, the context data is written, e.g., to the context 1006 data. At 1210, a token associated with the step is updated. When all tokens have been updated, execution of the wrapper procedure can end at 1212.

Because the workflow controller artifacts on the application server typically do not execute authorization checks on the data, the tasks 1202-1212 can be delegated to the in-memory platform. This ensures that data is protected at all times, whether accessed through the WMS or through direct means. To achieve this, in-memory platforms can support concepts that implement authorization checks through a visibility strategy in which, for example, users only see data for which they are authorized. Authorization can be achieved, for example, by defining visibility criteria on the rows and columns of the data. Through plugin techniques, the visibility strategy does not have to be defined completely by the WMS implementation (e.g., through up-front development tasks), but can be enhanced on a platform level through WMS system administrators (e.g., through configuration tasks). With this approach, a reasonable standard implementation strategy can be provided by the WMS implementation, but be refined by the necessities of business scenarios. For example, such visibility restrictions can be implemented by in-memory platform artifacts, such as views with pluggable visibility restrictions. In-memory RDBMSs, for example, can support such artifacts using views (e.g., "calculation views") and privileges (e.g., "analytic privileges"), the latter representing pluggable visibility restrictions. As an example, a standard implementation strategy defined by the WMS can provide visibility based on template information, whereas business scenarios can define visibility based on context data.

Besides the consistent authorization checks, this approach can improve performance. For example, on in-memory platforms, authorization checks can include primarily analysis-like read-only operations on special columns or on simple aggregates. Example operations can answer questions on aggregates such as along the lines of "Are the number of entries matching criteria greater than zero?" (e.g., a question for which in-memory platforms are optimal). The authorization data can typically be a comparably small part of the data sets. For example, because using main memory is typically much faster than using disk memory, authorization checks can be executed much more efficiently. Additionally, in-memory platforms can make use of column-based accesses, which can provide efficient, automatic indices on all columns. The efficiency can be due, in part, to a typically high compression factor achievable in authorization data (e.g., due to repeated status fields, or repeated "row owner" field contents).

Subsection: Read-Only, Up-to-Date, Consistent Views on Task Management Inboxes with Optimizations on, e.g., Substitution Support When displaying tasks to (human) users, e.g., using inbox components for task management, displaying contextual data side-by-side with task information can allow for an efficient processing of the task by the user. As described above, the approach of creating context data tables allows implementations of inboxes, based on in-memory platforms, that can efficiently retrieve the contextual data. The contextual data can underlie authorization or visibility restrictions implemented with the help of the in-memory platform. Due to efficient implementations of such restrictions on in-memory platforms, task management administration data can be reduced to a minimum and consistency can be increased.

For example, the conceptual approach of pushing the data authorization and visibility down into the database can allow further WMS-specific optimizations, e.g., if inbox components are based on up-to-date views that do not work on materialized, derived data. While standard inbox and task management component implementations cannot optimize for certain cases, the approach outlined herein can enable such optimizations. For example, inbox and task management components can usually support personnel substitution management, e.g., when users are substituting for other users (e.g., during absences). The inbox and task management components, for example, can provide visualization of tasks for which the absent user is responsible. While common WMS may implement complex visibility strategies in application code, in-memory platform database solutions can provide substitution strategies that are implemented on using existing database authorization and visibility levels. For example, a common substitution strategy can be along the lines of "Let me see my own tasks as well as those of users for whom I am substituting." Such strategies can be implemented, for example, by adding the visibility attributes of the substituted user to the attributes of the substituting user. Depending on the flexibility of the visibility concepts (e.g., with respect to ad-hoc modifiability), the substitution strategy "Let me see my own tasks as well as . . . " can be implemented by temporarily replacing the visibility attributes of the substituting user with those of the substituted user. Further optimizations can be done, e.g., if support for substitution is derived from the workflow model. For example, the standard substitution strategy can be defined during workflow model development, and inbox and task management implementation can be created based on analysis of the most efficient access paths.

Subsection: Workflow Controller/Scheduler Implementation Optimization

In common WMSs, a workflow controller component exists, containing much of the control flow and management logic that implements the support for workflow management. The workflow controller component is usually implemented in typical application layer programming languages, such as Java or C, or uses suitable application frameworks. By contrast, in techniques as described above, a thin workflow controller layer can be used which is itself derived and created based on the workflow template. The workflow controller layer's task is mainly to orchestrate the wrapper procedures. Orchestration occurs according to the workflow template, especially the control flow descriptions that are included. In some implementations, further tasks can implement external contracts, e.g., interfaces required by the application server, or can register with application server mechanisms, such as scheduling (described below), to be called back by these mechanisms.

Due to this integration aspect, the workflow controller artifact, as described herein, can be implemented using a language that supports the integration optimally. For example, if a workflow model references only application functions implemented in SQL, the workflow controller can be implemented using SQL functionality (e.g., stored procedures) as well, to further reduce transformation and communication costs. If integration with external, remotely accessible components is required, the workflow controller can be implemented in a language or integration framework that supports remote communication in a suitable manner. If application server mechanisms, such as scheduling, are available only to components implemented in certain languages or frameworks, then this can induce the necessary workflow controller implementation language or framework.

Application systems, as well as enhanced in-memory platforms, can provide configurable mechanisms scheduling the workflow controller of the WMS to drive the progress of the workflow. The scheduling can be done in at least two ways: e.g., at intervals or on-demand, the latter triggered through external actions that imply that the workflow can be driven forward. This approach can require an efficient event creation/control mechanism, which is not available in standard DBMS systems. Similar mechanisms, such as database triggers, can often be implemented only when duplicating event data into the WMS persistency, or cannot make use of bulk/burst occurrences of events. This is because triggers are unaware of concurrent "burst" events, thereby limiting optimization strategies.

Therefore, the techniques described above include the first approach, which is the creation of scheduling artifacts specific to the workflow model. These scheduling artifacts can use other artifacts, such as context data (as described above), for evaluating schedule optimization strategies. Implementing context data storage using core database artifacts in this way can enable value-adding mechanisms. For example, trigger mechanisms can be replaced by efficient analytical accesses, so that data duplication is reduced, which in turn can reduce the storage footprint of the application accordingly.

In some implementations, scheduling artifacts can make use of the built-in OLAP capabilities of in-memory platforms to determine optimizations of the scheduling. For example, the artifacts can reduce the frequency if only a few tasks are executed, or increase scheduling to reduce latency in case of burst events. In another example, the artifacts can make use of long-term analysis to determine which load is put on the system in a certain scenario (e.g., on average) and respectively limit resource usage to the long-term average. This can protect the system against outages in case of unexpected peaks in load, where otherwise unrelated scenarios would be negatively impacted with respect to their throughput or latency KPIs.

In summary, major advantages to common WMS implementations include improved performance and improved consistency. Improved performance, for example, can include transactional cases (e.g., workflow instance execution, due to push-down of execution to the in-memory platform), improved analytical cases (e.g., data context analysis, logging content analysis), due to optimal selection of implementation due to the artifact derivation step, improved scheduling (e.g., due to optimizing scheduling artifacts automatically and in-time, instead of manually and a-posteriori through humans), and improved common WMS functions (e.g., substitution management, by replacing application code by more performant in-memory artifact). Improved consistency can be due to, for example, a reduction of data duplication and enabling inboxes to display data based on context or data instead of derived data sets.

The approach described above also differs from common WMSs in a reduction of the layers. For example, most or all performance relevant components of a WMS can be pushed down to the in-memory database platform layer. Control and scheduling mechanisms are minimal and therefore can be implemented using respective application and scheduling mechanisms that are part of enhanced in-memory platforms.

Figure 13:
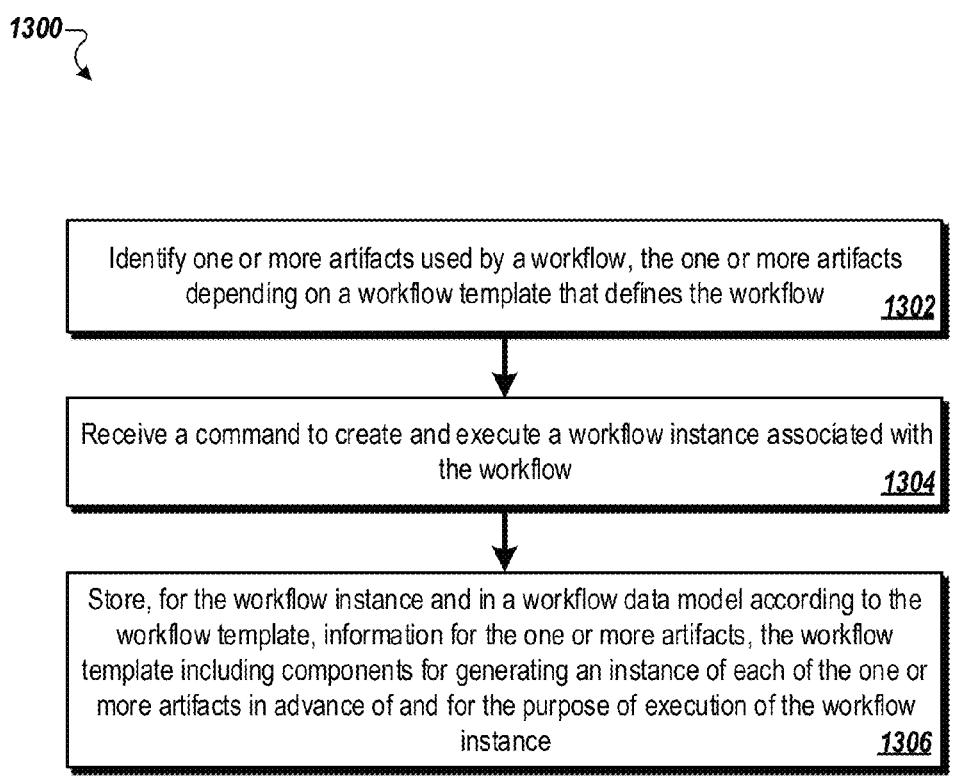
FIG. 13 is a flowchart of an example method for using in-memory artifacts for execution of workflow instances, according to an implementation.

FIG. 13 is a flowchart of an example method 1300 for using in-memory artifacts for execution of workflow instances, according to an implementation. For clarity of presentation, the description that follows generally describes method 1300 in the context of FIGS. 1 and 10-12. However, it will be understood that the method 1300 may be performed, for example, by any other suitable system, environment, software, and hardware, or a combination of systems, environments, software, and hardware as appropriate. For example, the workflow system 100 and/or its components can be used to execute the method 1300.

At 1302, one or more artifacts used by a workflow are identified, the one or more artifacts depending on a workflow template that defines the workflow. For example, referring to FIG. 11, artifacts identified for the workflow 1112 include the workflow template 1110 among other artifacts. Referring to FIG. 10, artifacts associated with the workflow model end up in the executable that is encapsulated in the encapsulation 1010. Artifacts can include, for example, SQL DDL statements, database tables, views and other artifacts. In some implementations, each artifact of the one or more artifacts includes imperative SQL artifacts, such as stored procedures reading from or modifying contents of a respective artifact. In some implementations, each artifact of the one or more artifacts is an imperative artifact executable on application systems (e.g., in contrast to database systems).

In some implementations, the one or more artifacts used by the workflow are used in an in-memory database platform, and the instance is an in-memory instance. For example, the artifacts associated with the workflow 1112 and controlled by the workflow controller 1004 for a particular workflow instance can be stored in volatile, random-access memory, for efficient and fast accesses during operation. This enables the feasibility of the aforementioned methods, because of response times acceptable for the users of the system. For transactional safety reasons (e.g., durability of executed transaction and their results), the artifacts can have suitable representations persisted on non-volatile memory.

At 1304, a command is received to create and execute a workflow instance associated with the workflow. For example, the workflow controller 1004 can receive a command that a particular workflow instance is to be executed.

At 1306, information for the one or more artifacts is stored for the workflow instance and in a workflow data model according to a workflow template. For example, the workflow data model includes components (e.g., template component, a workflow component, and a workflow controller) for generating an instance of each of the one or more artifacts in advance of and for the purpose of execution of the workflow instance.

In some implementations, the workflow template can provide, for example, sufficient semantic information to enable non-trivial optimization strategies. For example, the workflow template can include one or more of data model references, data model descriptions, control flow descriptions, data flow and transformation descriptions, information about background services to be called, and information about tasks for human users respectively about integrating user task management systems.

In some implementations, the method 1300 further includes determining a platform on which the workflow instance is executing and using the identified platform when generating the instances of the one or more artifacts, including generating the artifacts in a format compatible with the platform. For example, the format and other characteristics of the artifacts used by the workflow controller 1004 can depend on the type of platform (e.g., operating system, hardware, etc.) on which the workflow instances are to be executed.

Protection of Running Workflows Against Deployment of Workflow Model Patches

This section describes ways for protecting running workflow instances against deployment of workflow model patches. For example, workflow engines can use workflow models, each model describing a sequence and a data flow of a workflow which can be executed by a workflow engine. The models can be initially developed in a test-driven approach. Later in the lifecycle of the model, for example, changes to a model may be necessary to improve the end-to-end performance or the handling of the workflow, or to fix issues with the model. It can be a challenge, e.g., for a new patch, to get updated models deployed (e.g., registered) to the workflow engine. One reason is the existence of workflow instances that may be currently executing using older patches of that model. During deployment of a patched model, for example, workflow instances are best not to be executed. Otherwise, these instances can end up in an inconsistent state due to an intermediate state that the workflow model may be in, e.g., until the patch is successfully deployed.

Workflow execution can typically be done asynchronously, e.g., to improve performance in executing independent tasks, to have the execution decoupled from the start of an instance, and because of asynchronous tasks like user tasks or events. Therefore, workflow engines may have one or many executors to process those the tasks until they are completed. In some implementations, the executors can be managed by a job framework. For example, no matter how many executors the workflow engine uses, the executers may be running in parallel at the time that a deployment of a new patch is to occur. This means that all executors responsible for this model need to be stopped before the deployment of a new patch can be started. Common workflow systems may use some kind of locking mechanism. However, locking itself is a significant runtime overhead and hence generally has a negative performance impact.

Figure 14:
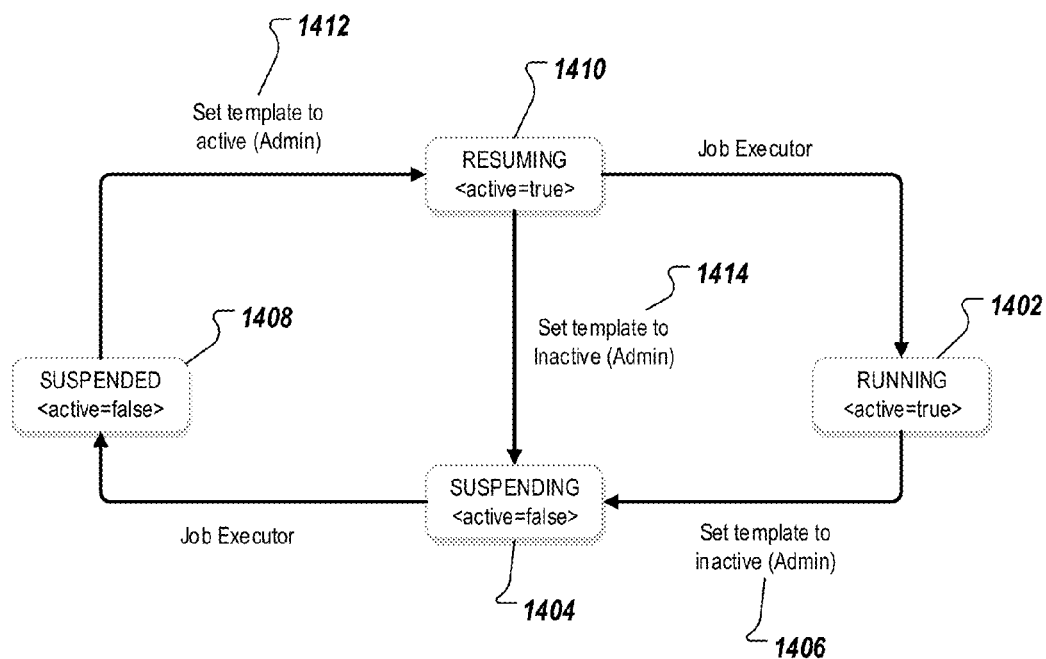
FIG. 14 shows an example state diagram for double-handshakes for suspending a workflow model, according to an implementation.

FIG. 14 shows an example state diagram for double-handshakes for suspending a workflow model, according to an implementation. For example, in order to have a lock-free execution of workflow start and execution, a double handshake can be used between all job executors and the deployment. Once the deployment of a model is triggered, for example, the model can be set to inactive, which means that the workflow model status will be changed to SUSPENDING.

For example, a workflow model can be in a RUNNING state 1402, e.g., when workflow instances associated with the model are executing. When a patch is to be deployed, the model can be set to a SUSPENDING state 1404, at the same time that the model is set to inactive (1406). In this case, the deployment of the model is not forced, otherwise data inconsistencies with executing workflow instances could result. When all job executors acknowledged that the model is being suspended, then the model status can be set to a SUSPENDED state 1408, and the patch can be deployed, replacing the current version of the model with the updated version of the model.

Once the patch has been deployed, an administrator action, for example, can set the model to a RESUMING state 1410, while at the same time indicating that the model is ACTIVE 1412. After all job executors have acknowledged that the model is resuming, then the model can be set back to the RUNNING state 1402. Workflows can also be suspended manually at any time, and the model can be set (1414) to inactive.

The corresponding job executor can take care of the status transition from SUSPENDING to SUSPENDED. As mentioned above, each model can have multiple job executors, with each job executor having its own work list. All job executors need to suspend, for example, before the central status of the model can also be set to SUSPENDED. In order to achieve this, each job executor can write its own entry in a list or table by calling the Model Manager. When the last (missing) job executor writes its entry, the Model Manager can finally set the status to SUSPENDED. Because the job executors are independent, it is possible, e.g., that job 1 executor 1 is executed twice before job executor 3 gets called. This can occur, for example, due to a different load on the different job executors.

Figure 15:
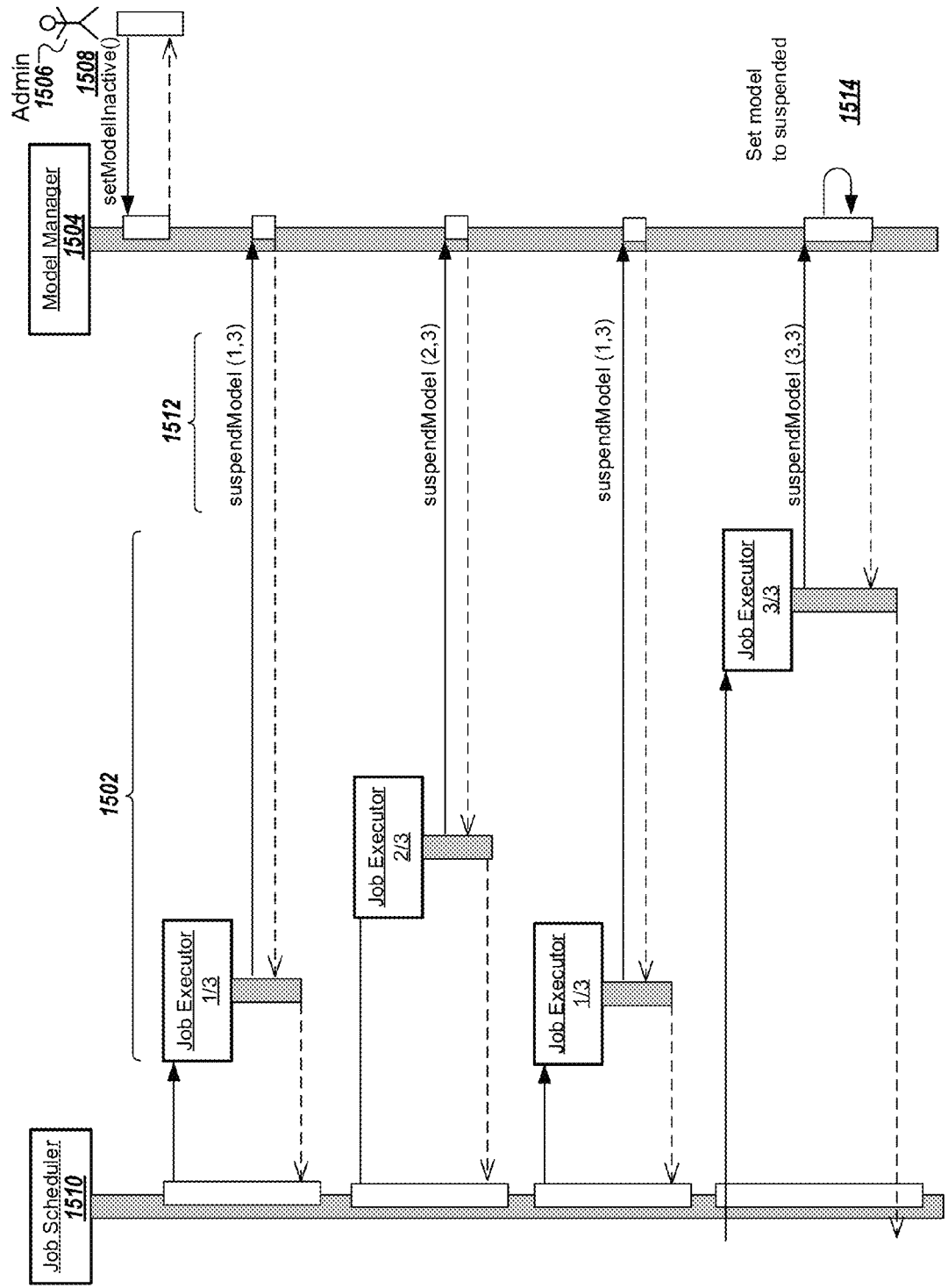
FIG. 15 shows an example communication between the individual job executors and a model manager during suspension of a workflow model, according to an implementation.

FIG. 15 shows an example communication between the individual job executors 1502 and a model manager 1504 during suspension of a workflow model, according to an implementation. For example, the model manager 1504 can suspend three job executors 1502. Once the status is SUSPENDED, the actual deployment of a patch can start. When the deployment has finished, the double handshake pattern can be used to drive the status of the model via RESUMING back to RUNNING. The status diagram 1400 above indicates in which states the model is active versus inactive. "Inactive" means that the job executors are stopped and therefore no workflow instance can be executed, but new workflow instances can still be started.

For example, an example sequence can start when an administrator 1506 initiates a command to deactivate 1508 the model. Information associated with the model can be written to the database, for example, indicating that the model is SUSPENDING. As a job scheduler 1510 schedules jobs to be executed, the job executors 1502 associated with the jobs can indicate that they acknowledge the SUSPENDING state information 1512, which can also be written to the database. When all three (in this example) job executors 1502 have completed their acknowledgements, then the model manager 1504 can mark 1514 the model as SUSPENDED. In this way, all of the job executors 1502 can be stopped before deployment of a new workflow template.

In common environments for deploying workflow models, administrative actions may typically be used to signal the workflow engine that the execution of workflow instances belonging to a certain workflow model shall be suspended and resumed. As such, deployments to such a system are only allowed with an administrator approval.

An example benefit of the workflow model deployment approach described herein is the execution of workflow instances without any kind of locking. The deployment needs to wait only until all executors have responded. Also, new workflow instances can still be started during that timeframe. Using this approach, the deployment can be finished within seconds, permitting workflow instance execution using the new model.

Figure 16:
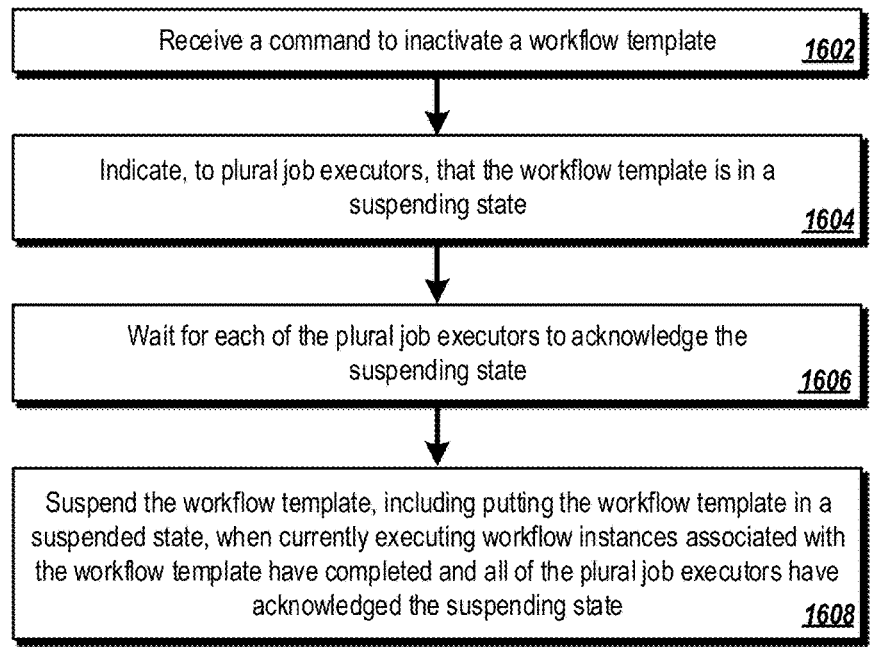
FIG. 16 is a flowchart of an example method for protecting running workflows against deployment, according to an implementation.

FIG. 16 is a flowchart of an example method 1600 for protecting running workflows against deployment, according to an implementation. For clarity of presentation, the description that follows generally describes method 1600 in the context of FIGS. 1 and 14-15. However, it will be understood that the method 1600 may be performed, for example, by any other suitable system, environment, software, and hardware, or a combination of systems, environments, software, and hardware as appropriate. For example, the workflow system 100 and/or its components can be used to execute the method 1600.

At 1602, a command is received to inactivate a workflow template. For example, the workflow system 100 can receive an indication from the client device 106 that the workflow template 110 is to be inactivated, such as if the associated workflow is being changed by the user.

At 1604, an indication is provided to plural job executors that the workflow template is in a suspending state. For example, the workflow controller 102 can send a message to each of the job executors 104 that the workflow template 110 is suspending. At this time, the workflow template 110 can be set to a SUSPENDING state 1404.

At 1606, waiting occurs for each of the plural job executors to acknowledge the suspending state. As an example, the workflow controller 102 can wait until each of the job executors 104 have responded, e.g., acknowledging that they have received the message regarding the suspending workflow template 110.

At 1608, when currently executing workflow instances associated with the workflow template have completed and all of the plural job executors have acknowledged the suspending state, the workflow template is suspended, including putting the workflow template in a suspended state. The workflow controller 102, for example, can wait until the workflow instances 112 associated with the workflow template 110 have completed and the job executors 104 have acknowledged the suspending state. Once these events have occurred, the workflow controller 102 can put the workflow template 110 in the SUSPENDED state 1408.

In some implementations, suspending and suspended states are indicated by entries in a table associated with the workflow template. For example, the workflow controller 102 can indicate the SUSPENDED state 1408 by updating and storing an indicator for the workflow template 110 in the workflow states 114.

In some implementations, the method 1600 further includes allowing additional workflow instances to be started during the suspending state. As an example, until the workflow template 110 is put in a SUSPENDED state, the workflow controller 102 can allow additional workflow instances 112 to be started by the job executors 104.

In some implementations, the method 1600 further includes indicating, to the plural job executors, that the workflow template is in a resuming state, and when all of the plural job executors have acknowledged the resuming state, indicating that the workflow template is in a running state. For example, when the workflow template 110 is put in a SUSPENDED state and after an updated workflow template 110 is deployed, the workflow controller 102 can resume use of the workflow template 110. In some implementations, resuming use of the workflow template 110 can include notifying the job executors 104 that the workflow template 110 is resuming, putting the workflow template 110 in a RESUMING state 1410, and waiting for the job executors 104 to acknowledge the resuming state. When acknowledgements have been received from all of the job executors 104, the workflow controller 102 can put the workflow template 110 in the RUNNING state 1402.

Although the detailed description has been separated by headings for different sections of topics, capabilities associated with the topics can be combined in various ways to achieve results not specifically addressed in this document.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a Web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communications between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a Web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:
1. A method, comprising:
  receiving, from a client associated with a user, a patch to a workflow template associated with a workflow;
  determining a mode associated with a workflow management system, the mode being a developer-ON mode, when the workflow is developed, or a developer-OFF mode; and
  updating the workflow template using the patch, including using mode-dependent actions based on the determined mode, including:

blocking execution of new workflow instances of the workflow;
allowing for the deployment of the updated workflow template;
allowing starting of new workflow instances during the deployment;
when the determined mode is the developer-ON mode:
blocking execution of new workflow instances of the workflow using database-level locks;
unblocking the execution of new workflow instances; and
continuing the execution of existing workflow instances with the newest workflow template patch version no matter on which patch version the workflow instances originally have been started; and
when the determined mode is a developer-OFF mode:
blocking execution of new workflow instances of the workflow using double handshake method;
permitting the continued execution of existing workflow instances associated with the latest patch version of that workflow template; and
forbidding the continued execution of existing workflow instances associated with an older patch version of the workflow template.

2. The method of claim 1, further comprising, when the determined mode is the developer-OFF mode:
receiving an input to suspend workflows prior to updating and deploying the workflow template.

3. The method of claim 2, further comprising:
resuming execution of suspended workflows upon completion of updating and deploying the workflow template.

4. The method of claim 3, wherein suspending workflow instances and resuming execution of suspended workflow instances includes using flags associated with the workflow template, the resuming including periodically checking the flags by a workflow manager.

5. The method of claim 1, further comprising:
receiving temporal information identifying a time at which the workflow template is to be updated and deployed; and
delaying the updating and deploying of the workflow template until the identified time.

6. The method of claim 1, wherein the patch includes one or more of a change in steps of the workflow, data used or created by the workflow instance, and user interaction associated with the workflow.

7. A non-transitory, computer-readable medium storing computer-readable instructions executable by a computer and configured to perform operations to:
receive, from a client associated with a user, a patch to a workflow template associated with a workflow;
determine a mode associated with a workflow management system, the mode being a developer-ON mode, when the workflow is developed, or a developer-OFF mode; and
update the workflow template using the patch, including using mode-dependent actions based on the determined mode, including:
block execution of new workflow instances of the workflow;
allow for the deployment of the updated workflow template;
allow starting of new workflow instances during the deployment;
when the determined mode is the developer-ON mode:
block execution of new workflow instances of the workflow using database-level locks;
unblock the execution of new workflow instances; and
continue the execution of existing workflow instances with the newest workflow template patch version no matter on which patch version the workflow instances originally have been started; and
when the determined mode is a developer-OFF mode:
block execution of new workflow instances of the workflow using double handshake method;
permit the continued execution of existing workflow instances associated with the latest patch version of that workflow template; and
forbid the continued execution of existing workflow instances associated with an older patch version of the workflow template.

8. The non-transitory, computer-readable medium of claim 7, further comprising instructions to, when the determined mode is the developer-OFF mode:
receive an input to suspend workflows prior to updating and deploying the workflow template.

9. The non-transitory, computer-readable medium of claim 8, further comprising instructions to:
resume execution of suspended workflows upon completion of updating and deploying the workflow template.

10. The non-transitory, computer-readable medium of claim 9, wherein suspending workflow instances and resuming execution of suspended workflow instances includes using flags associated with the workflow template, the resuming including periodically checking the flags by a workflow manager.

11. The non-transitory, computer-readable medium of claim 7, further comprising instructions to:
receive temporal information identifying a time at which the workflow template is to be updated and deployed; and
delay the updating and deploying of the workflow template until the identified time.

12. The non-transitory, computer-readable medium of claim 7, wherein the patch includes one or more of a change in steps of the workflow, data used or created by the workflow instance, and user interaction associated with the workflow.

13. A system, comprising:
a memory;
at least one hardware processor interoperably coupled with the memory and configured to:
receive, from a client associated with a user, a patch to a workflow template associated with a workflow;
determine a mode associated with a workflow management system, the mode being a developer-ON mode, when the workflow is developed, or a developer-OFF mode; and
update the workflow template using the patch, including using mode-dependent actions based on the determined mode, including:
block execution of new workflow instances of the workflow;
allow for the deployment of the updated workflow template;
allow starting of new workflow instances during the deployment;
when the determined mode is the developer-ON mode:

block execution of new workflow instances of the workflow using database-level locks;

unblock the execution of new workflow instances; and continue the execution of existing workflow instances with the newest workflow template patch version no matter on which patch version the workflow instances originally have been started; and when the determined mode is a developer-OFF mode:

block execution of new workflow instances of the workflow using double handshake method;

permit the continued execution of existing workflow instances associated with the latest patch version of that workflow template; and forbid the continued execution of existing workflow instances associated with an older patch version of the workflow template.

14. The system of claim 13, further configured to, when the determined mode is the developer-OFF mode:

receive an input to suspend workflows prior to updating and deploying the workflow template.

15. The system of claim 14, further configured to:

resume execution of suspended workflows upon completion of updating and deploying the workflow template.

16. The system of claim 15, wherein suspending workflow instances and resuming execution of suspended workflow instances includes using flags associated with the workflow template, the resuming including periodically checking the flags by a workflow manager.

17. The system of claim 13, further configured to:

receive temporal information identifying a time at which the workflow template is to be updated and deployed; and delay the updating and deploying of the workflow template until the identified time.

18. The system of claim 13, wherein the patch includes one or more of a change in steps of the workflow, data used or created by the workflow instance, and user interaction associated with the workflow.

* * * * *